United States Patent [19]

Fujii

[11] Patent Number: 4,604,656
[45] Date of Patent: Aug. 5, 1986

[54] TAPE STOP POSITION DETECTING APPARATUS AND MAGNETIC VIDEO REPRODUCING APPARATUS USING THE SAME

[75] Inventor: Toshifumi Fujii, Nagaokakyo, Japan

[73] Assignee: Mitsubishi Denki Kabushiki Kaisha, Tokyo, Japan

[21] Appl. No.: 587,958

[22] Filed: Mar. 9, 1984

[30] Foreign Application Priority Data

Mar. 11, 1983 [JP] Japan .................................. 58-41250
Apr. 29, 1983 [JP] Japan .................................. 58-76709
Oct. 20, 1983 [JP] Japan .................................. 58-197780
Oct. 21, 1983 [JP] Japan .................................. 58-197798

[51] Int. Cl.$^4$ ........................ G11B 5/00; H04N 5/782
[52] U.S. Cl. .................................. 360/10.1; 360/10.3; 360/72.1; 358/312; 358/323
[58] Field of Search .................. 360/9.1, 10.1, 10.2, 360/10.3, 72.1, 74.4, 77, 78, 27; 358/323, 312

[56] References Cited

U.S. PATENT DOCUMENTS 4,056,832 11/1977 de Boer .
4,297,733 10/1981 Sanderson .
4,443,823 4/1984 Sakamoto .............................. 360/77
4,550,345 10/1985 Terada et al. ..................... 360/27 X Primary Examiner—Robert L. Richardson
Attorney, Agent, or Firm—Lowe Price Leblanc Becker & Shur

[57] ABSTRACT

A tape stop position detecting apparatus for a magnetic video reproducing apparatus in which four kinds of pilot signals ($f_1$ to $f_4$) recorded in a magnetic tape together with a video signal are reproduced from the magnetic tape comprises a comparing circuit (301), a region signal generating circuit (401) and a position signal generating circuit (402). The comparing circuit (301) compares the amounts of two signals ($f_1$ and $f_3$) to generate a comparison output (S9). The region signal generating circuit (401) operates in response to the comparison output (S9) to generate signals (O1 and O2) indicating in which region the stop position of the magnetic tape is located. The position signal generating circuit (402) operates in response to the comparison output (S9) and a head selecting signal (HSW) to generate a signal (O3) indicating the stop position of the magnetic tape. By the above described signals (O1 to O3), the stop position of the magnetic tape can be detected.

21 Claims, 62 Drawing Figures

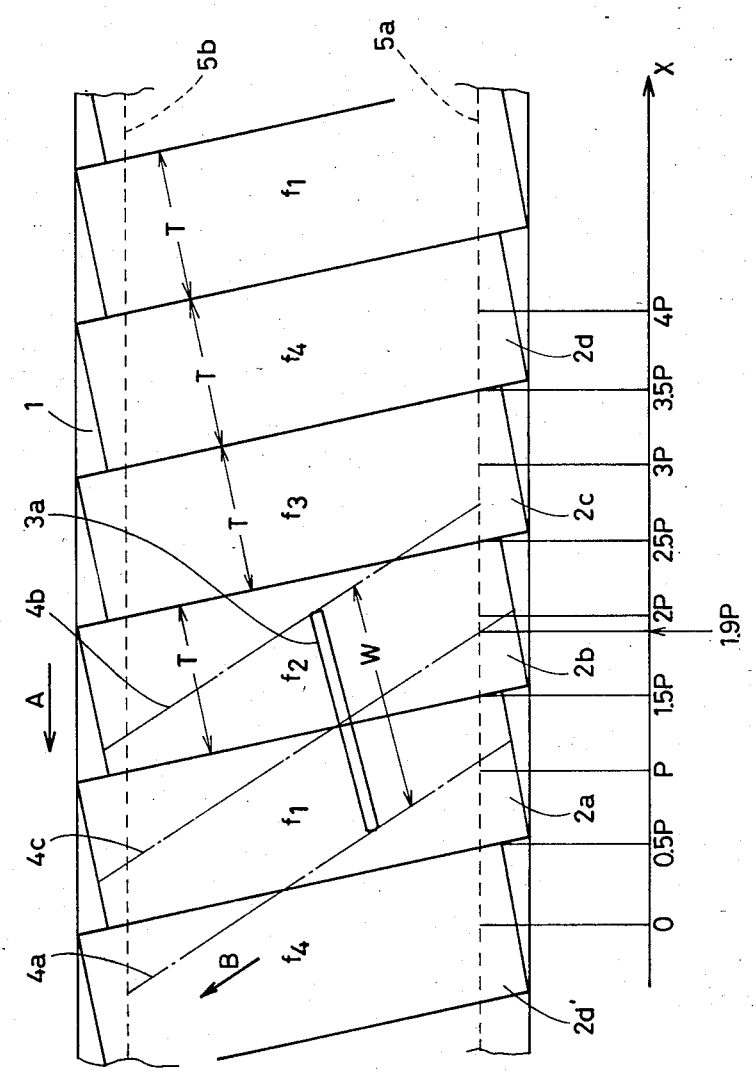

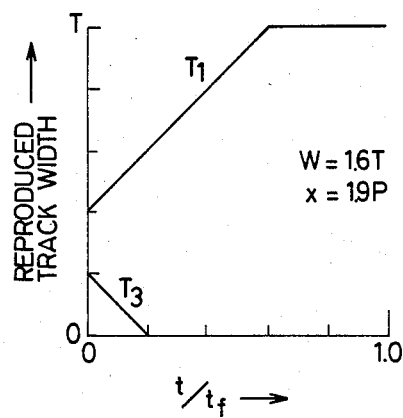
FIG.2A
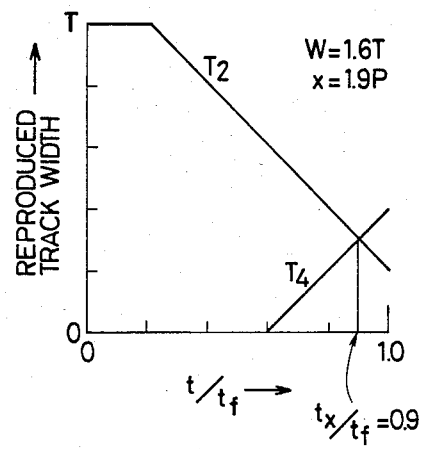
FIG.2B
FIG.3
| STOP POSITION OF MAGNETIC TAPE | RELATION OF REPRODUCED TRACK WIDTH $T_1$ AND $T_3$ |
|---|---|
| $X_1$<br>$0 < x < P$ | $T_1 > T_3$   $T_1 < T_3$<br>$0 \quad t_x \quad t_f$   t |
| $X_2$<br>$P \leqq x \leqq 2P$ | $T_1 > T_3$<br>$0 \qquad t_f$   t |
| $X_3$<br>$2P < x < 3P$ | $T_1 > T_3$<br>$T_1 < T_3$<br>$0 \quad t_x \quad t_f$ |
| $X_4$<br>$3P \leqq x \leqq 4P$ | $T_1 < T_3$<br>$0 \qquad t_f$ |

| STOP POSITION x OF MAG TAPE | RELATION OF REPRODUCED TRACK WIDTH $T_1$ AND $T_3$ | RELATION OF REPRODUCED TRACK WIDTH $T_2$ AND $T_4$ |
|---|---|---|
| $x_1$<br>$0 < x < P$ | $T_1 > T_3$, $T_1 < T_3$ at $t_x$ | $T_2 < T_4$ |
| $x_2$<br>$P \leq x \leq 2P$ | $T_1 > T_3$ | $T_2 > T_4$, $T_2 < T_4$ at $t_x$ |
| $x_3$<br>$2P < x < 3P$ | $T_1 > T_3$, $T_1 \leq T_3$ at $t_x$ | $T_2 > T_4$ |
| $x_4$<br>$3P \leq x \leq 4P$ | $T_1 < T_3$ | $T_2 \geq T_4$, $T_2 < T_4$ at $t_x$ |

TAPE STOP POSITION DETECTING APPARATUS AND MAGNETIC VIDEO REPRODUCING APPARATUS USING THE SAME

BACKGROUND OF THE INVENTION

1. Field of the Invention

The present invention relates to a tape stop position detecting apparatus and a magnetic video reproducing apparatus using the same and particularly relates to a tape stop position detecting apparatus and a magnetic video reproducing apparatus using the same by which four kinds of pilot signals recorded in a magnetic tape together with a video signal serve to detect a stop position of the magnetic tape.

2. Description of the Prior Art

Generally, in a magnetic video tape recording and reproducing apparatus (referred to hereinafter as a VTR), in order to make tracking adjustment and the like, rotational magnetic heads are often constructed to be enabled to record successively four pilot signals $f_1$, $f_2$, $f_3$ and $f_4$ of four different frequencies generated in synchronism with the rotation of the rotational magnetic heads by superimposing them on the video signals to be recorded so that reproduction of the pilot signals and the video signals may be made simultaneously. In the U.S. Pat. No. 4,297,733 (and the corresponding Dutch Patent Application No. 7,702,815), a VTR using such four pilot signals is disclosed. In addition, in the U.S. Pat. No. 4,056,832 (and the corresponding Dutch Patent Application Nos. 7,409,513 and 7,500,395), a VTR in which a magnetic head reads out simultaneously the data in a selected track and the long wavelength positioning signals (i.e. pilot signals for tracking) in the two adjacent tracks is disclosed. These patents or patent applications are incorporated herein for reference. In such apparatus, if the reproducing position on a magnetic tape in a state where the magnetic tape is stopped in the reproduction mode, that is, a stop position of the magnetic tape can be detected in relation to the video tracks of the magnetic tape in which the pilot signals $f_1$, $f_2$, $f_3$ and $f_4$ are recorded, such detection serves to shorten the pull-in time of a servo system for controlling the travelling of the magnetic tape at the time of transition from the still picture reproduction to the normal reproduction, to maintain the continuity of the pilot signals between the video track where recording was already made and the video track where recording is to be newly made in the successive recording, and to control the magnetic tape travelling to obtain a noiseless still picture, and thus the performance of the VTR can be enhanced.

SUMMARY OF THE INVENTION

Therefore, a principal object of the present invention is to provide a tape stop position detecting apparatus and a magnetic video reproducing apparatus using the same by which pilot signals recorded in a magnetic tape, are detected to indicate the stop position of the magnetic tape.

Briefly stated, the present invention is a tape stop position detecting apparatus for a magnetic video reproducing apparatus where first to fourth pilot signals having different frequencies recorded in the first to fourth video tracks in a magnetic tape cyclically together with a video signal are reproduced, comprising: a plurality of rotational magnetic heads for reproducing the above stated signals to provide a reproduced signal; comparing means for comparing predetermined two pilot signals out of the first to fourth pilot signals contained in the reproduced signal to provide a comparison output; a head selecting signal generating means for generating a head selecting signal for making selection of the rotational magnetic heads; region signal generating means for generating a region signal, in response to the comparison output, indicating in which region among the first to fourth regions associated with the first to fourth video tracks the stop position of a magnetic tape is located, the stop position of the magnetic tape being the reproducing position on the magnetic tape when the magnetic tape is at a stop; and position signal generating means for generating a position signal indicating the stop position of the magnetic tape in response to the comparison output and the head selecting signal in case where the stop position of the magnetic tape is located in predetermined two regions out of the first to fourth regions.

In a tape stop position detecting apparatus of the first type in accordance with the present invention, a comparison output is obtained by comparing the levels of two pilot signals contained in a reproduced signal and the comparison output and a head selecting signal serve to detect the region where the stop position of the magnetic tape is located among the four regions and at the same time a triangular wave signal generator provides a signal indicating a distance between the stop position and one end of the region in which the stop position is located, whereby the tape stop position can be detected with high precision. Accordingly, the detecting apparatus of the first type can be effectively utilized for various purposes such as reduction of the pull-in time of a servo system for control of the travelling of a magnetic tape, maintaining of the continuity of the pilot signals in the successive recording, or control of the travelling of a magnetic tape for obtaining a noiseless still picture, and thus the performance of a VTR can be enhanced.

In a tape stop position detecting apparatus of the second type in accordance with the present invention, a specified stop position of a magnetic tape can be detected in case where the stop position is located in any one of the four regions. Accordingly, also with this detecting apparatus of the second type, the performance of a VTR can be enhanced in the same manner as in the case using the above described first type detecting apparatus.

According to a magnetic video reproducing apparatus using the tape stop position detecting apparatus of the first type, a stop position of a tape is detected by the tape stop position detecting apparatus and based on the detected data, the constant speed travelling time of the tape is controlled to make the tape travel to a stop position mode suitable for slow reproduction and still reproduction. Therefore, without requiring any adjustment operation by an operator, a noiseless picture of slow reproduction and still reproduction can be obtained extremely easily.

According to a magnetic video reproducing apparatus using the tape stop position detecting apparatus of the second type, slow reproduction and still reproduction of good quality can be realized without any adjustment operation, in the same manner as in the case of the above described magnetic video reproducing apparatus.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing a relation between video tracks and a locus of a magnetic head in a magnetic tape.

FIGS. 2A and 2B are graphs showing a track width reproduced in the state where the magnetic tape is stopped.

FIG. 3 is a table showing a quantitative relation of the reproduced track widths with respect to the stop position of the magnetic tape.

DESCRIPTION OF THE PREFERRED EMBODIMENTS

Figure 4:
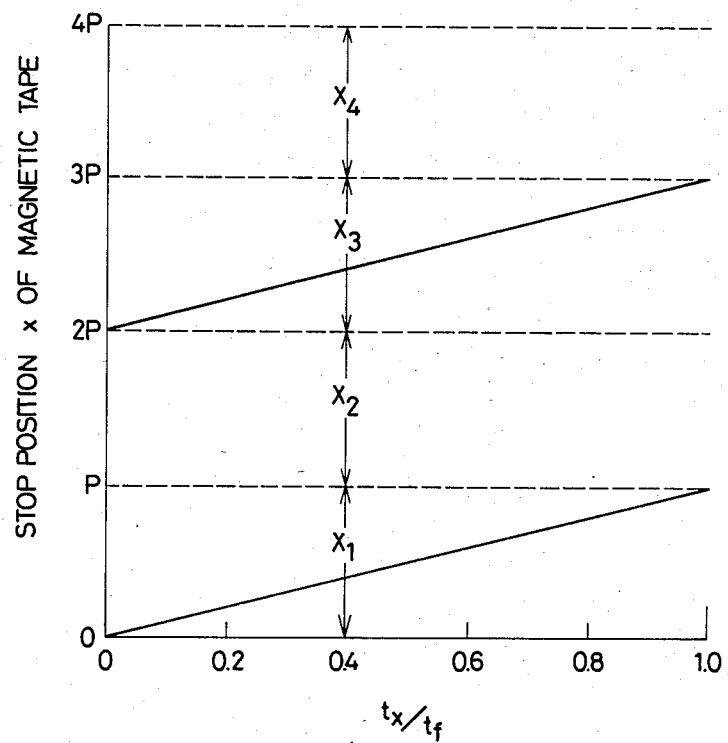
FIG. 4 is a graph showing a relation between the stop position of the magnetic tape and the point at which the quantitative relation of the reproduced track widths is reversed.

FIG. 1 shows video tracks 2a, 2b, 2c and 2d on a magnetic tape 1 and travelling loci of the lower end, the upper end and the center of a magnetic head 3a or 3b (the magnetic head 3b is not shown) in the state where the magnetic tape 1 is stopped. In FIG. 1, the arrows A and B indicate respectively the travelling direction of the magnetic tape 1 and the travelling direction of the magnetic heads 3a and 3b. The character T indicates a width of each of the video tracks 2a to 2d; the character W indicates a width of the magnetic head 3a or 3b; and the character P indicates a track pitch in the longitudinal direction of the magnetic tape 1. In the video tracks 2a to 2d, pilot signals $f_1$ to $f_4$ are recorded respectively in a manner overlapping with the video signals. The video tracks 2a, 2b, 2c and 2d are recorded by two magnetic heads having different azimuths. The video tracks 2a and 2c are recorded by the same magnetic head and the video tracks 2b and 2d are recorded by the other same magnetic head. The reference characters 5a and 5b indicate switching points of the magnetic heads 3a and 3b at the time of reproduction.

Now, let us assume that the stop position of the magnetic tape 1 is represented as a point of intersection between the travelling locus 4c of the center of the magnetic head 3a or 3b and the switching point 5a and that a point of intersection between the center of the video track 2d' and the switching point 5a is an origin O whereby the coordinate x is determined in the direction opposed to the tape travelling direction A. More specifically, the stop position of the magnetic tape 1 in FIG. 1 is $x=1.9P$. Since the video tracks 2a to 2d are cyclically recorded by regarding four tracks as one cycle with respect to the pilot signals, all the stop positions can be represented by $x=0$ to $4P$.

The above described pilot signals $f_1$ to $f_4$ are signals having frequencies of approximately 100 KHz to 200 KHz which satisfy the conditions: $|f_1-f_2| \approx |f_3-f_4|=f_a$, $|f_1-f_4| \approx |f_2-f_3|=f_b$, $f_a \neq f_b$, where $f_a$ and $f_b$ are respectively severals tens of KHz. For example, the signals $f_1$, $f_2$, $f_3$ and $f_4$ have frequencies of 102 KHz, 118 KHz, 164 KHz and 148 KHz, respectively, and $f_a$ and $f_b$ become 16 KHz, and 46 KHz, respectively. Since the pilot signals $f_1$ to $f_4$ have low frequencies as compared with the video signals, there is little influence by the azimuth effects of the magnetic heads 3a and 3b and, therefore, they can be reproduced also by magnetic heads having different azimuths from those at the time of recording.

FIG. 2A shows reproduced track widths $T_1$ and $T_3$ of the video tracks 2a and 2c in one field period in the stop position of the magnetic tape 1 shown in FIG. 1, namely, in the state of $x=1.9P$. The reproduced track width mentioned above means a width of a portion where a magnetic head and a video track overlap each other. In FIG. 2A, the horizontal axis represents the time t normalized by one field time $t_f$. For example, $t/t_f=0$ and $t/t_f=1$ correspond to the time at which the centers of the magnetic heads 3a and 3b pass through the switching points 5a and 5b, respectively. Each of the widths W of the magnetic heads 3a and 3b in FIG. 2A is 1.6 times as large as a track width T. FIG. 2B shows reproduced track widths $T_2$ and $T_4$ of the video tracks 2b and 2d in the same manner as in FIG. 2A. In FIG. 2B, the reproduced track widths $T_2$ and $T_4$ becomes equal at the time of $t/t_f=0.9$, after which the value $T_4$ becomes larger than the value $T_2$ reversely.

FIG. 3 shows a relation between the reproduced track widths $T_1$ and $T_3$ in one field period with respect to the value x of the stop position of the magnetic tape 1. In FIG. 3, it is assumed that a region of $0<x<P$ is $X_1$, a region of $P \leq x \leq 2P$ is $X_2$, a region of $2P<x<3P$ is $X_3$ and a region of $3P \leq x \leq 4P$ is $X_4$. As is clear from FIG. 3, it can be determined in what region out of the regions $X_1$, $X_2$, $X_3$ and $X_4$ the stop position x of the magnetic tape 1 is situated by detecting whether the relation between the reproduced track widths $T_1$ and $T_3$ in one field period is reversed or not, and by determining the relation of the reproduced track widths $T_1$ and $T_3$ if the above described relation is not reversed and determining the relation of the reproduced track widths $T_1$ and $T_3$ before or after the reversion if the above described relation is reversed.

FIG. 4 shows a relation between the stop position x of the magnetic tape and the time $t_x$ when the above described relation of the reproduced track widths $T_1$ and $T_3$ is reversed. The time $t_x$ is the time variable in case where the starting point of the field is represented as $t_x=0$. As is seen from FIG. 4, the value of the stop position x can be determined by detecting the above described time $t_x$ if the stop position x is located in the region $X_1$ or $X_3$.

In the first embodiment of the present invention, the stop position of the magnetic tape is detected by utilizing the above described proportional relation between a reproduced track width and a level of a pilot signal contained in a reproduced signal of a magnetic head and also utilizing a relation between the stop position of the magnetic tape and the reproduced track width.

Figure 6:
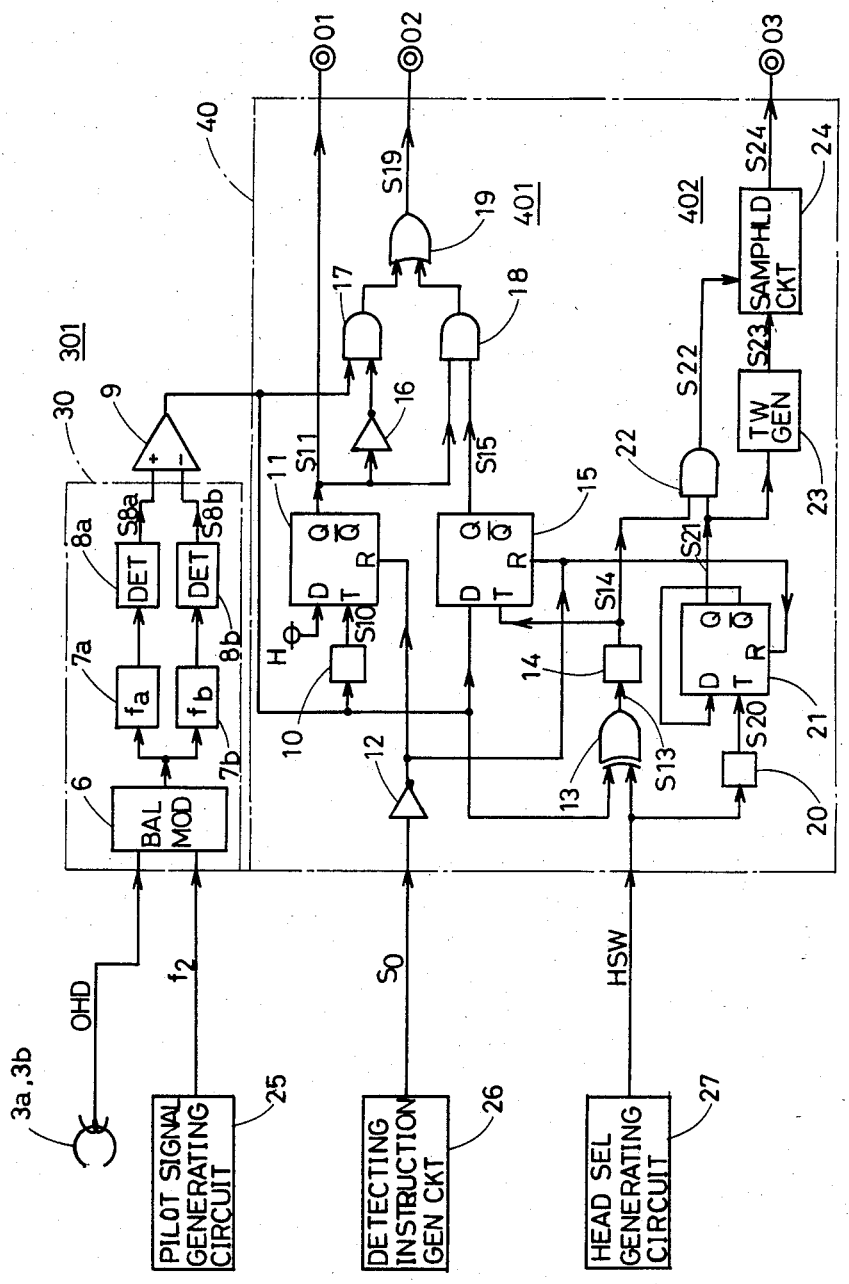
FIG. 6 is a block diagram of a tape stop position detecting apparatus in accordance with the first embodiment of the present invention.

FIG. 6 is a block diagram of a tape stop position detecting apparatus in accordance with the first embodiment of the present invention. The reference character 30 indicates signal level detecting means for detecting separately the levels of two pilot signals contained in the reproduced signal OHD reproduced by the rotational magnetic heads 3a and 3b. The above described signal level detecting means 30 comprises a balanced modulator 6, bandpass filters 7a and 7b having center frequencies $f_a$ and $f_b$, respectively, and detectors 8a and 8b. To the balanced modulator 6, the above described reproduced signal OHD and a pilot signal $f_2$ from a pilot signal generating circuit 25 are supplied. The reference character 9 indicates a comparator (signal level comparing means) for comparing the levels of the two input signals to provide high potential (referred to hereinafter as "H") or low potential (referred to hereinafter as "L") according to the quantitative relation between the two levels. The reference character 40 indicates detection signal providing means for providing a signal corresponding to the stop position of the magnetic tape 1. The detection signal providing means 40 comprises: pulse generators 10, 14 and 20 for generating pulses of the positive polarity at the time of rising or falling of the input signals; D-flip-flop 11, 15, and 21 which operate at the time of rising of the input signals to the trigger terminals T and become in a reset state (namely, the output terminals Q are in "L") when the reset terminals R are "H"; inverting circuits 12 and 16; an exclusive OR circuit 13; AND circuits 17, 18 and 22; an OR circuit 19; triangular wave generator 23 for generating triangular waves in synchronism with an input signal applied thereto; and a sample-and-hold circuit 24. To the inverting circuit 12, detecting instruction So is supplied from a detecting instruction generating circuit 26. To the exclusive OR circuit 13 and the pulse generator 20, a head selecting signal HSW is supplied from a head selecting signal generating circuit 27. The pilot signal generating circuit 25, the signal level detecting means 30 and the comparator 9 constitute a comparing circuit 301 for comparing pilot signals $f_1$ and $f_3$ contained in the reproduced signal OHD to provide a comparison output S9. The detection signal providing means 40 comprises a region signal generating circuit 401 for generating as outputs O1 and O2, region signals indicating in which of the regions $X_1$ to $X_4$ the stop position of the magnetic tape is located and further comprises a position signal generating circuit 402 for generating as an output O3 a position signal indicating the stop position of the magnetic tape.

Figure 5:
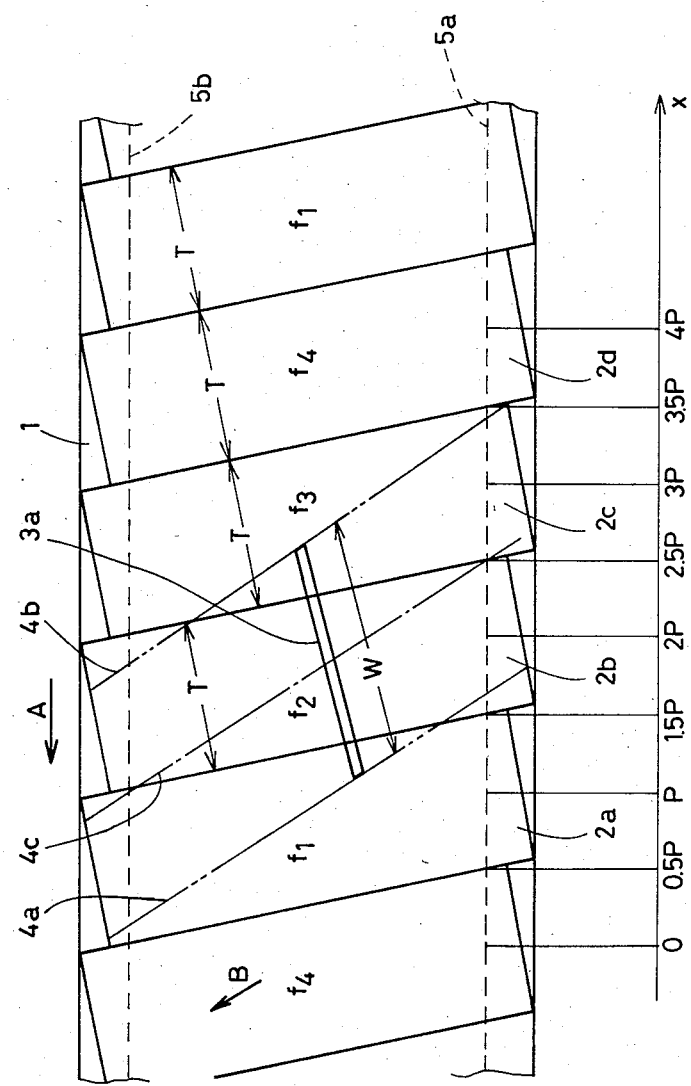
FIG. 5 is a diagram showing a relation between the video tracks and the locus of a magnetic head in case where the stop position of the tape is $x=2.5P$.
Figure 7:
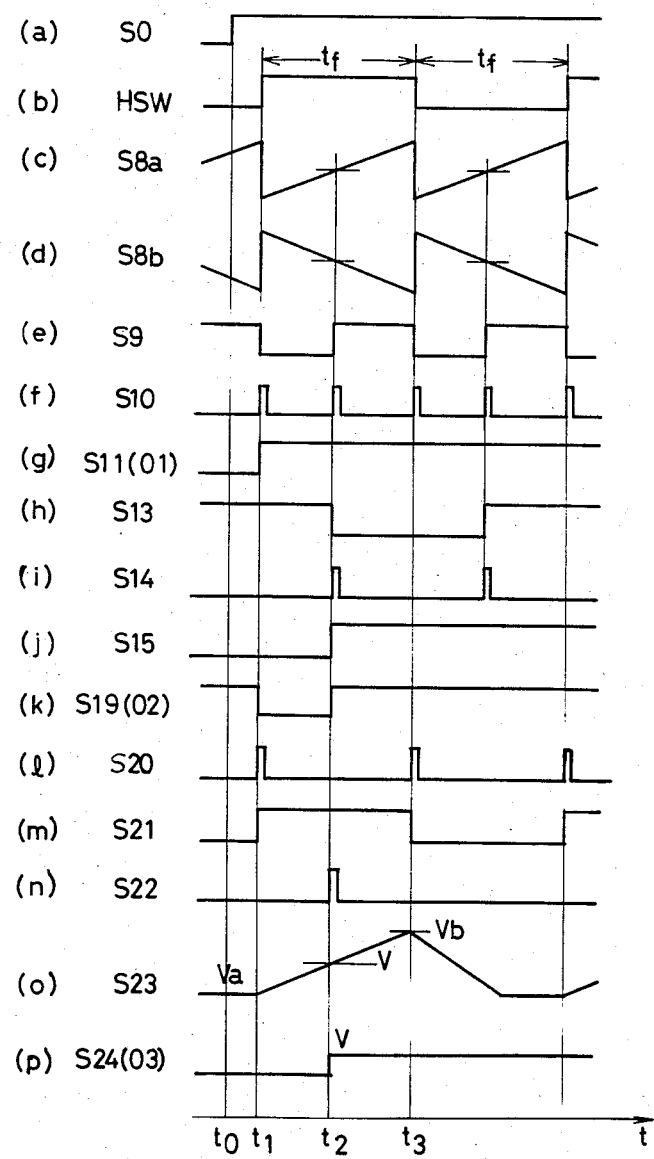
FIGS. 7(a) thru 7(p) are graphs showing waveforms of the signals in the respective portions in the FIG. 6 apparatus.

FIG. 7 is a timing chart for explaining the operation in the embodiment shown in FIG. 6, taking an example in which the stop position of the magnetic tape 1 is x=2.5P as shown in FIG. 5.

In the following, the operation will be described.

First, as shown in FIG. 7a, stop position detecting instruction So is provided at the time $t=t_0$. Before this time, the D-flip-flops 11, 15 and 21 are respectively brought in a reset state and each output terminal Q is made to be in "L".

To the balanced modulator 6, a reproduced signal OHD of the rotational magnetic heads 3a and 3b and a pilot signal $f_2$ are supplied. As shown in FIG. 5, the reproduced signal of the rotational magnetic head 3a contains pilot signals $f_1$ and $f_3$ besides the pilot signal $f_2$. Accordingly, the balanced modulator 6 supplied with these signals provides signals including beat signals having frequencies $f_a$ and $f_b$ which satisfy the conditions of $|f_1-f_2|=f_a$ and $|f_2-f_3|=f_b$, respectively, as described above. The above described reproduced signals OHD may be obtained by amplifying a signal reproduced by the rotational magnetic heads 3a or 3b and making it pass through the filters having pilot signals $f_1$, $f_2$, $f_3$ and $f_4$ in the passband. The bandpass filters 7a and 7b detect beat signals of the frequencies $f_a$ and $f_b$ (referred to hereinafter simply as the beat signals $f_a$ and $f_b$) separately from the output of the balanced modulator 6 and the detectors 8a and 8b provide signal levels as shown in FIGS. 7c and 7d respectively. The outputs S8a and S8b of the detectors 8a and 8b are supplied to the comparator 9 where the levels thereof are compared. Now, the stop position of the magnetic tape 1 is x=2.5P and accordingly the outputs S8a and S8b of the detectors 8a and 8b become the same value at the time of $t=t_2$ as shown in FIGS. 7c, 7d and after this time, the output S9 of the comparator 9 becomes in a reversed relation, as shown in FIG. 7e. In addition, if the quantitative relation between the levels of the beat signals $f_a$ and $f_b$ is reversed in the field period as in this example, the output S9 of the comparator 9 is also reversed at the time of $t=t_1$ which is the starting time of the field.

The quantitative relation of the levels of the beat signals $f_a$ and $f_b$ corresponds to the quantitative relation of the levels of the pilot signals $f_1$ and $f_3$ contained in the reproduced signals OHD detecting by the magnetic heads 3a and 3b.

The pulse generator 10 generates pulses S10 of the positive polarity in synchronism with the rise and fall of the output of the comparator 9 as shown in FIG. 7f so that the pulses S10 are supplied to the trigger terminal T of the D-flip-flop 11. The D-flip-flop 11 has a data terminal D connected in "H" and when the pulses of the positive polarity are supplied to the trigger terminal T at the above described time of $t=t_1$, the output terminal Q, namely, the output S11(O1) becomes "H" as shown in FIG. 7g.

On the other hand, when the output S9 of the comparator 9 and the head selecting signal HSW for selection of the magnetic heads 3a and 3b are supplied to the exclusive OR circuit 13 and the output S13 therefrom is further supplied to the pulse generator 14, as shown in FIGS. 7h and 7i, a signal where the pulses of the positive polarity in synchronism with the rise and fall of the head selecting signal HSW are removed from the signal shown in FIG. 7f is obtained. By the output S14 of the pulse generator 14, the D-flip-flop 15 is triggered and the output S9 in "H" of the comparator 9 supplied to the data terminal D is provided to the output terminal Q. Since the output terminal Q of the D-flip-flop 11 is also in "H" as described above, potential "H" is provided to the output S19 (O₂) of the OR circuit 19.

The pulse generator 20 provides pulses S20 of the positive polarity in synchronism with the rise and fall of the head selecting signal HSW as shown in FIG. 7l so that the pulses S20 are supplied to the trigger terminal T of the D-flip-flop 21. Since the data terminal D of the D-flip-flop 21 is connected to the output terminal $\overline{Q}$ thereof, the output terminal Q becomes "H" by the first input of trigger pulses after the stop position detecting instruction So is provided, and subsequently "H" and "L" are attained repeatedly with a cycle of two-field period, as shown in FIG. 7m. The triangular wave generator 23 provides a signal S23 of the potential increased in synchronism with the rise of the output from the terminal Q of the D-flip-flop 21 from Va by a fixed increasing rate $(Vb-Va)/t_f$ and decreased in synchronism with the fall of the output from the terminal Q of the above described D-flip-flop 21 from Vb to Va, as shown in FIG. 7o. The sample-and-hold circuit 24 samples and holds the output S23 of the triangular wave generator 23 by using, as sampling pulses, the output S22 of the AND circuit 22 which is a logical product of the output S14 of the pulse generator 14 and the output S21 of the output terminal Q of the D-flip-flop 21 as shown in FIGS. 7l to 7p. As a result, the potential of the output O3 becomes V. The potential V is $V=(Va+Vb)/2$ as is clear from the correspondence with FIG. 4.

The foregoing description was made of a case where the tape stop position x is $x=2.5P$. If the tape stop position x is in the region $X_3$, the FIG. 6 embodiment makes the same operation, in which the output O1 is "H", the output O2 is "H" and the potential of the output O3 is $Va+(x-2P)(Vb-Va)/P$. As is clear from FIGS. 6 and 7, according to the present embodiment, the stop position data is provided by the lapse of one-field time as for the output O1 and O2 and of two-field time as for the output O3, after the stop position detecting instruction So is provided, irrespective of the timing with which the detecting instruction So is issued.

Next, in case where the stop position x is in the region $X_1$, the polarities of the signals in FIGS. 7c, 7d and 7e are reversed and potential "L" is provided to the output terminal Q of the D-flip-flop 15. The output O1 becomes "H" as in the above described case of $x=2.5P$ and the output O2 becomes "L". The potential of the output O3 becomes $Va+x\cdot(Vb-Va)/P$.

In addition, in case where the stop position x is in the region $X_2$ or $X_4$, the relation of the reproduced track widths $T_1$ and $T_3$ namely, the relation of the levels of the beat signals fa and fb is not reversed as shown in FIG. 3, and accordingly, the output terminal Q of the D-flip-flop 11, namely the output O1 is maintained in "L". At this time, to the output O2, the output S9 of the comparator 9 is provided as it is and the output O2 becomes "H" if x is in the region $X_2$ and becomes "L" if x is in the region $X_4$. The potential of the output O3 at this time does not depend on the stop position x.

Summarizing the foregoing description, according to the present embodiment, it can be determined by the outputs O1 and O2 in "H" or "L" what region out of the regions $X_1$, $X_2$, $X_3$ and $X_4$ the stop position x belongs to and the value x can be detected from the potential of the output O3 in case where x is in the region $X_1$ or $X_3$, shown in Table 1.

TABLE 1

| stop position of the magnetic tape | O1 | O2 | O3 |
|---|---|---|---|
| $X_1$ $0 < x < P$ | H | L | $Va + x(Vb - Va)/P$ |
| $X_2$ $P \leq x \leq 2P$ | L | H | — |
| $X_3$ $2P < x < 3P$ | H | H | $Va + (x - 2P)(Vb - Va)/P$ |
| $X_4$ $3P \leq x \leq 4P$ | L | L | — |

Although in the above described embodiment, the levels of the pilot signals $f_1$ and $f_3$ contained in the reproduced signal OHD of the magnetic heads 3a and 3b were detected by beating with the pilot signal $f_2$, the detection can also be made in the same manner by using the pilot signal $f_4$ instead of the pilot signal $f_2$, and furthermore, the detection can be made also by selecting suitably the center frequencies of the bandpass filters 7a and 7b if signals different from the pilot signals $f_2$ and $f_4$ are used. The levels of the pilot signals $f_1$ and $f_3$ can also be detected by supplying the reproduced signal OHD obtained from the magnetic heads 3a and 3b to the bandpass filters having center frequencies $f_1$ and $f_3$ respectively to detect the outputs thereof. Although in the above described embodiment, the levels of the pilot signals $f_1$ and $f_3$ were compared, it goes without saying that the same detection operation can be made by using the pilot signals $f_2$ and $f_4$.

As described above, according to the first embodiment, the levels of two pilot signals contained in the reproduced signal are compared to provide a comparison output, and by the comparison output and a magnetic head selecting signal, detection can be made as to which of the four regions the stop position of the magnetic tape belongs to and by using a triangular wave generator, output is provided to verify a distance from one end of each region. Therefore, the above described stop position can be detected with high accuracy and consequently the performance of the VTR can be enhanced effectively.

In the above described first embodiment, in case where the stop position x is the region $X_2$ or $X_4$, the stop position x cannot be detected in a concrete manner. Then, the following description will be made of the second embodiment in which the stop position x can be detected in a concrete manner even if the stop position x is in either the region $X_2$ or $X_4$.

Figures 8, 9:
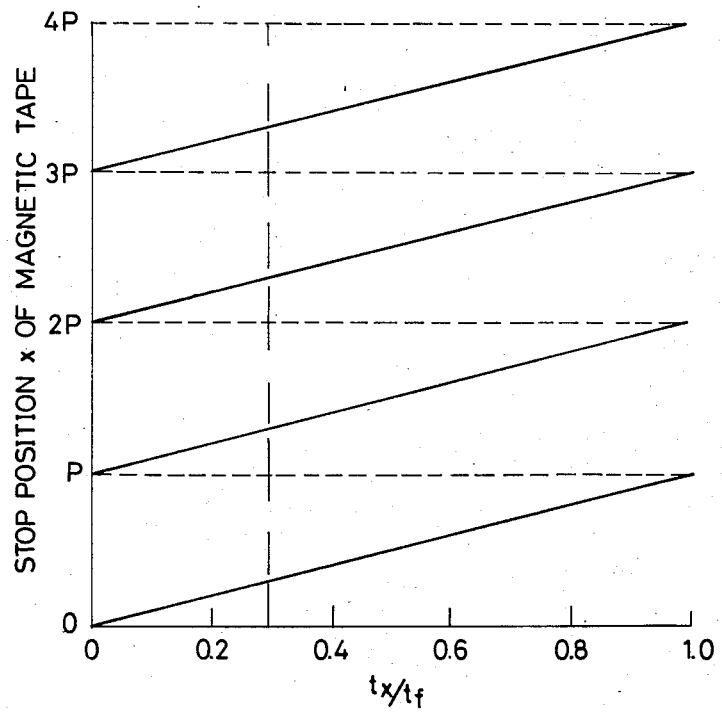
FIG. 8 is a table showing a quantitative relation of the reproduced track widths with respect to the stop position of the magnetic tape.
FIG. 9 is a graph showing a relation between the stop position of the magnetic tape and the point at which the quantitative relation of the reproduced track widths is reversed.

FIG. 8 corresponds to FIG. 3 and shows a relation of the reproduced track widths $T_1$ and $T_3$ and a relation of the widths $T_2$ and $T_4$ in one field period with respect to the stop position x of a magnetic tape. It is assumed that a region of $0 < x < P$ is $X_1$, a region of $P \leq x \leq 2P$ is $X_2$, a region of $2P < x < 3P$ is $X_3$ and a region of $3P \leq x \leq 4P$ is $X_4$. As is clearly understood from FIG. 8, in comparison of the two groups of the reproduced track widths $T_1$ and $T_3$, and $T_2$ and $T_4$ in one field period, there is one group in which the quantitative relation of the track widths is not reversed in any one of the regions $X_1$ to $X_4$, and by verifying the quantitative relation of the reproduced track widths in the group without reversion, it can be determined what region out of the regions $X_1$, $X_2$, $X_3$ and $X_4$ the stop position x of the magnetic tape belongs to. For example, in comparison of the reproduced track widths $T_1$ and $T_3$, if $T_1$ is always larger than $T_3$, the stop position x of the magnetic tape is in the region $X_2$, and if $T_1$ is always smaller than $T_3$, the stop position x is in the region $X_4$. Also, by verifying the quantitative relation of the reproduced track widths and the presence or absence of a point where the relation is reversed, it can be determined what region out of the regions $X_1$ to $X_4$ the stop position x of the magnetic tape 1 belongs to.

However, referring to FIG. 8, in the region $X_2$, the reproduced track widths become in a relation of $T_1=T_3$ with the timing of (x=p, t=t$_f$) and (x=2P, t=0) and the reproduced track widths become in a relation of $T_2=T_4$ with the timing of (x=P, t=0) and (x=2P, t=t$_f$). Also in the region $X_4$, the reproduced track widths become $T_1=T_3$ with the timing of (x=3P, t=t$_f$) and (x=4P, t=0) and become $T_2=T_4$ with the timing of (x=3P, t=0) and (x=4P, t=t$_f$).

Since the pilot signals $f_1$, $f_2$, $f_3$ and $f_4$ are written in the video tracks in an overlapping manner, the above described reproduced track widths $T_1$, $T_2$, $T_3$ and $T_4$ have respectively a proportional relation with the amplitudes of the pilot signals $f_1$, $f_2$, $f_3$ and $f_4$ contained in the reproduced signal OHD of the magnetic heads 3a and 3b.

In the second embodiment, the position of the magnetic tape is detected by utilizing the above described proportional relation between the reproduced track widths and the amplitudes of the pilot signals as well as a corresponding relation between the stop position x of the magnetic tape 1 and the reproduced track widths $T_1$, $T_2$, $T_3$ and $T_4$ as described above with reference to FIGS. 2 and 8.

FIG. 9 shows a relation between the stop position x of the magnetic tape and the time $t_x$ when the quantitative relation of the above described reproduced track widths $T_1$ and $T_3$ or $T_2$ and $T_4$ is reversed. The time $t_x$ represents the time in case where the starting point of the field is assumed to be represented as $t_x=0$. From FIG. 9, it is to be understood that the value of $t_x/t_f$ changes according to the stop positions in the regions $X_1$ to $X_4$ and that the relation between the stop position in each of the regions $X_1$ to $X_4$ and the value of $t_x/t_f$ is represented always in the same proportion. Accordingly, in each region, the same reference voltage is formed, as shown in FIG. 9, so that by extracting and using the reference voltage value at $t_x$, the position in the region concerned can be detected. Thus, this embodiment has greater advantages in that not only a region to which the stop position of the tape belongs out of the regions $X_1$ to $X_4$ can be detected but also an exact stop position of the magnetic tape in the region can be detected.

In case where the stop position x is x=P, 2P, 3P or 4P, the quantitative relation of the above described reproduced track widths is not reversed at any point and accordingly, in such case, based on the relation shown in Table 2, the value x, which P, 2P, 3P or 4P can be determined. This Table 2 gives a complementary explanation concerning the case where the position x shown in FIG. 8 is one of the above described four values. From Table 2, for example, it can be determined that x=P is established if the above described reproduced track widths are not in a reversed relation and the conditions of $T_1 \geq T_3$ and $T_2 \leq T_4$ are satisfied.

TABLE 2

| stop position x | relation of $T_1$ and $T_3$ | relation of $T_2$ and $T_4$ |
|---|---|---|
| P | $T_1 \geq T_3$ | $T_2 \leq T_4$ |
| 2P | $T_1 \geq T_3$ | $T_2 \geq T_4$ |
| 3P | $T_1 \leq T_3$ | $T_2 \geq T_4$ |
| 4P | $T_1 \leq T_3$ | $T_2 \leq T_4$ |

Figure 10:
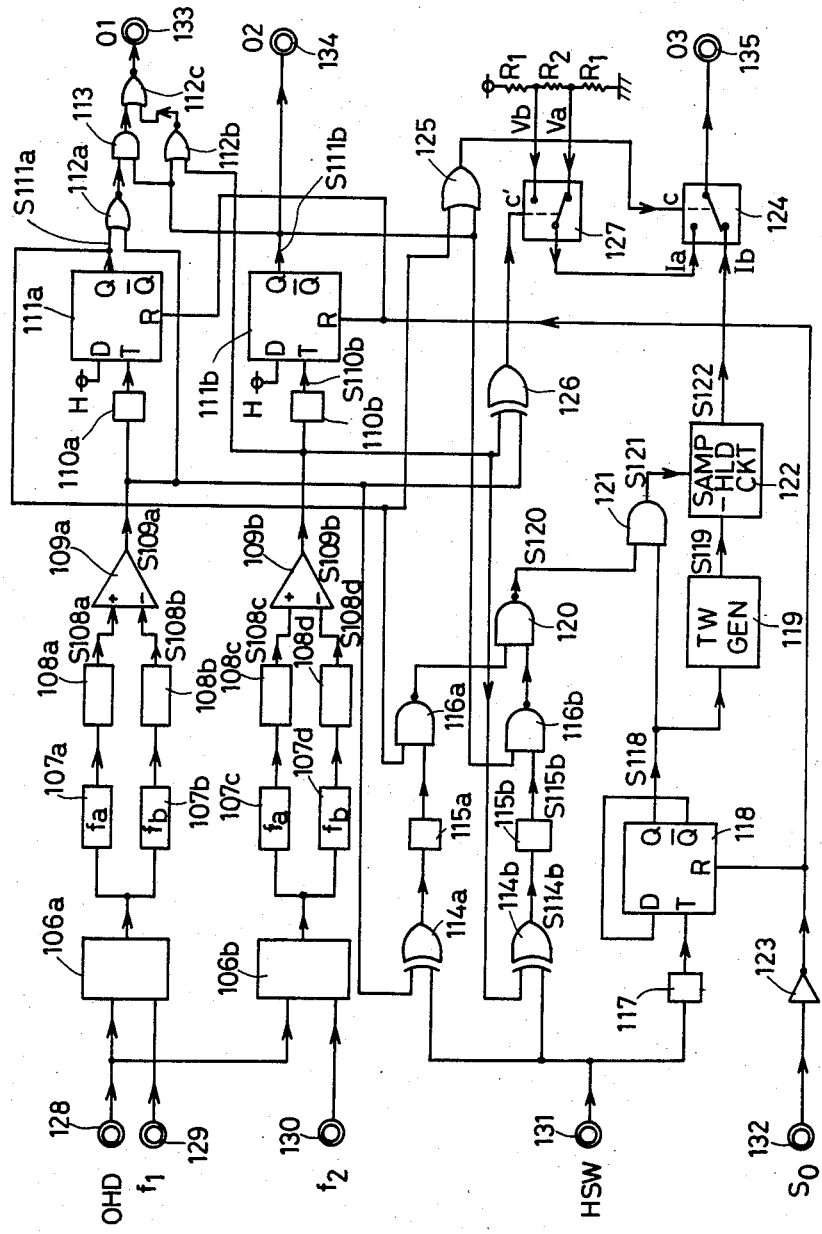
FIG. 10 is a block diagram of a tape stop position detecting apparatus in accordance with the second embodiment of the present invention.

FIG. 10 is a block diagram of the second embodiment of the present invention. First, description will be made of the structure of major portions in FIG. 10. The above described reproduced signal OHD from the rotational magnetic heads 3a and 3b containing pilot signals is supplied to an input terminal 128. The reproduced signal OHD is then supplied to balanced modulators 106a and 106b. To the balanced modulator 106a, a pilot signal $f_1$ supplied to an input terminal 129 is also applied so that this pilot signal $f_1$ and the pilot signals $f_2$ and $f_4$ contained in the reproduced signal OHD form a beat signal of the frequency $f_a$ or $f_b$ (referred to hereinafter as a beat signal $f_a$ or $f_b$) The pilot signal $f_1$ is a signal supplied from a pilot signal generating circuit (not shown) in the same manner as in FIG. 2. An output signal of the balanced modulator 106a is supplied to bandpass filters 107a and 107b having the center frequencies set to the frequencies $f_a$ and $f_b$ of the above described beat signal respectively, so that beat signal components contained in the output signal of the balanced modulator 106a are separated. The separated beat signals $f_a$ and $f_b$ are respectively detected by detectors 108a and 108b to form signals S108a and S108b having corresponding amplitudes, which are supplied to input terminals of a comparator 109a where the levels of the two input signals are compared. The comparator 109a supplies a signal S109a of a high level or low level to a pulse generator 110a based on the result of comparison. The pulse generator 110a generates pulses of the positive polarity at the time of rising or falling of the input signal and supplies the pulses to a trigger terminal T of a D-flip-flop 111a.

On the other hand, to the other balanced modulator 106b, the above described pilot signal $f_2$ supplied to an input terminal 130 is applied. The balanced modulator 106b generates a beat signal $f_a$ or $f_b$ formed between the pilot signals $f_1$ and $f_3$ contained in the reproduced signal and the pilot signal $f_2$, so that the beat signal $f_a$ or $f_b$ is supplied to a comparator 109b through bandpass filters 107c and 107d and detectors 108c and 108d. An output signal S109b of the comparator 109b is supplied to a pulse generator 110b, which generates pulses S110b of the positive polarity and supplies the pulses S110b to a trigger terminal T of a D-flip-flop 111b.

To an input terminal 131, the above described head selecting signal HSW is supplied. The head selecting signal HSW is supplied to a trigger terminal T of a D-flip-flop 118 through pulse generating circuit 117. To an input terminal 132, the above described detecting instruction So is provided and the detecting instruction So is supplied as a reset signal to reset input terminals of the D-flip-flops 111a, 111b and 118. An output S118 of the D-flip-flop 118 is supplied to a triangular wave generating circuit 119 which generates a triangular wave signal. A triangular wave signal S119 generated by the triangular wave generating circuit 119 is supplied to a sample-and-hold circuit 122. The sample-and-hold circuit 122 serves to sample and hold the triangular wave signal by using an output S121 of the AND gate 121 as sampling pulses, as described afterwards in detail concerning the operation.

Figure 11:
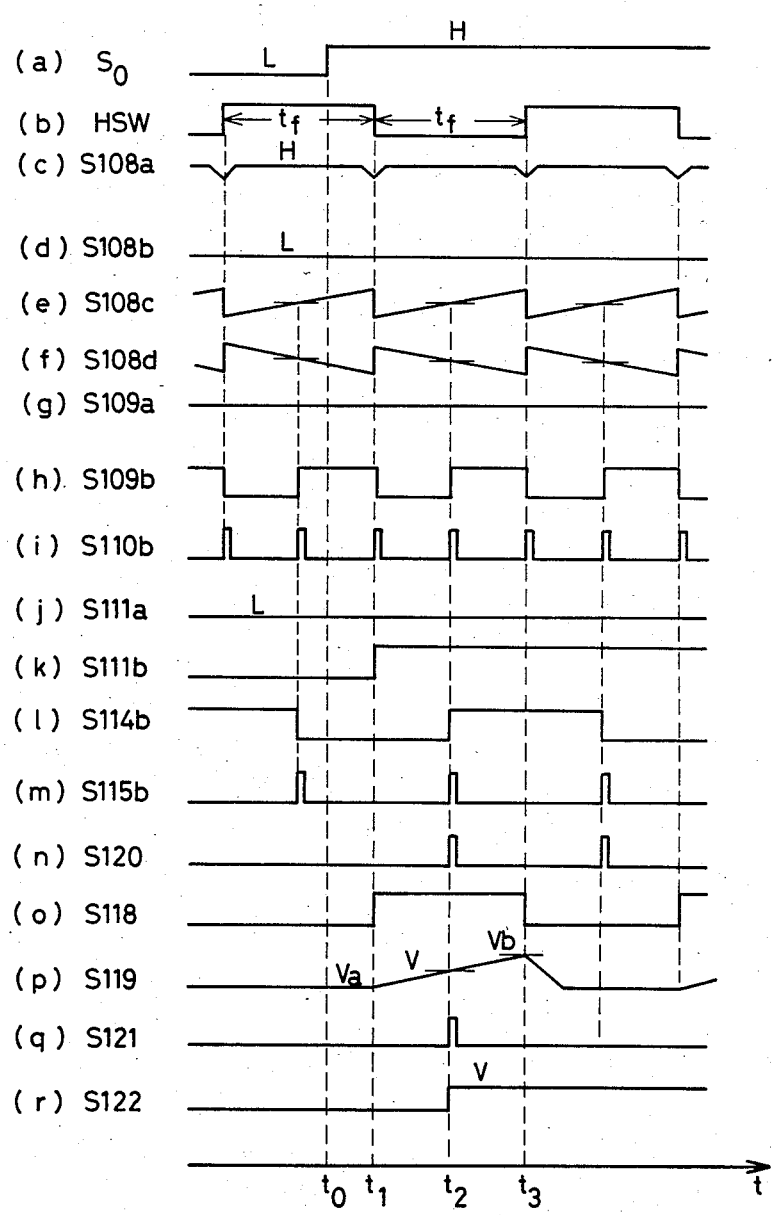
FIGS. 11(a) thru 11(r) are graphs showing waveforms of the signals in respective portions in the FIG. 10 apparatus.

FIG. 11 is a timing chart for explaining the operation of the circuit shown in FIG. 10. Now, an operation of the second embodiment of the present invention will be described in detail with reference to FIG. 11. As shown in FIG. 11a, it is assumed that the stop position detecting instruction So is provided at the time of $t=t_0$. Before this time, the D-flip-flop 11a, 11b and 118 are made to be in a reset state and the respective output terminals S are in a low level. The balanced modulator 106a provides signals of the frequencies containing beat signals $f_a$ and $f_b$ as described above, generated by the second and the fourth pilot signals $f_2$, $f_4$ out of the four pilot signals contained in the reproduced signal OHD and the pilot signal $f_1$ of a fixed amplitude supplied thereto separately. The quantitative relation of the amplitudes of the beat signals $f_a$ and $f_b$ correspond to the quantitative relation of the amplitudes of the pilot signals $f_2$ and $f_4$ contained in the reproduced signal OHD. As for the above described reproduced signal OHD, a signal reproduced by the rotational magnetic heads 3a and 3b may be amplified and then supplied through a filter having pilot signals $f_1$, $f_2$, $f_3$ and $f_4$ in the passband thereof, and in such case, the reproduced signal OHD has an advantage that it does not undergo unfavorable influences due to a video signal and the like.

The bandpass filters 107a and 107b respectively separate and detect the beat signals $f_a$ and $f_b$ from the output of the balanced modulator 106a and the detectors 108a and 108b provide signals representing the amplitudes of the respective beat signals. The outputs S108a and S108b of the detectors 108a and 108b are supplied to the comparator 109a, where the amplitudes are compared. In the same manner, the balanced modulator 106b provides a beat signal $f_a$ or $f_b$ based on the first and third pilot signals $f_1$ and $f_3$ and the separately supplied pilot signal $f_2$, and the bandpass filters 107c and 107d separate the beat signals $f_a$ and $f_b$. The detectors 108c and 108d provide signals representing the amplitudes of the beat signals $f_a$ and $f_b$ and the amplitudes are compared in the comparator 109b. The relation of the amplitudes of the beat signals $f_a$ and $f_b$ in this case correspond to the relation of the amplitudes of the pilot signals $f_1$ and $f_3$ contained in the reproduced signal. If the stop position of the magnetic tape 1 is $x=2.5P$, the outputs S108a to S108d of the detectors 108a to 108d change as shown in FIGS. 11c to 11f. At this time, the output S109a of the comparator 109a is always in a high level as shown in FIG. 11g, while the output S109b of the comparator 109b changes to the opposite level at the time when the values of the outputs S108c and S108d of the detectors 108c and 108d become in a reversed relation after these values become equal (for example, at the time of $t=t_2$ in FIG. 11) and at the starting point of the field (for example, at the time of $t=t_1$ in FIG. 11). FIG. 11b represents the waveform of a head selecting signal HS for selecting the rotational magnetic head 3a or 3b.

In synchronism with the reversal of the output S109b of the comparator 109b at the time of $t=t_1$, the pulse generator 110b generates pulses S110b of the positive polarity and by the pulses S110b, the D-flip-flop 111b is triggered so that a high level signal supplied to the data terminal D is provided in the output terminal Q. On the other hand, the output terminal Q of the D-flip-flop 111a is maintained in a low level.

At this time, output signals O1 and O2 generated in the first and second output terminals 133 and 134 both become in a high level. In the embodiment shown in FIG. 10, the data indicating in what region out of the regions $X_1$ to $X_4$ the rotational magnetic heads 3a and 3b located (namely a rough stop position of the magnetic tape) is determined by the combination of the output signals O1 and O2 shown in Table 3 to be described later. Accordingly, in case where the output signals O1 and O2 are both in a high level, it can be determined that the stop position of the magnetic tape is in the region $X_3$. Thus, in the embodiment shown in FIG. 10, a rough stop position of the magnetic tape can be verified by the two-value data of the output signals O1 and O2. The regions mentioned above need not be four regions $X_1$ to $X_4$ and for example, only two regions may be provided. Two regions may be structured so that the case where the output signals O1 and O2 have different levels in Table 3, (namely the combination of a high level and a low level or of a low level and a high level), is regarded as one region and the case where the output signals have the same level (namely, the combination of a high level and a high level or of a low level and a low level) is regarded as the other region. Such structure can be easily realized by further connecting an exclusive OR circuit for example, to the first and second output terminals 133 and 134. In addition, the number of regions is not limited to the number indicated in the above described embodiment and more than four regions may be structured.

As described above, the stop position of the magnetic tape can be detected by a unit of a region defined in the longitudinal direction of the magnetic tape and the detection signals can be applied for various uses according to necessities.

Now, a method for detecting the stop position of the magnetic tape more accurately in a concrete manner, not by a unit of a region, will be described with reference to FIGS. 10 and 11. In this case also, the above described output signals O1 and O2 are needed and in the region indicated by the output signals O1 and O2, a signal indicating a specified position is obtained, whereby an accurate stop position can be readily detected. Referring to FIG. 10, the output S114b of the exclusive OR circuit 114b changes from a high level to a low level in synchronism with the timing where the outputs S108c and S108d of the detectors 108c and 108d become equal to be in a reversed relation, as shown in FIG. 11l. The pulse generator 115b generates pulses S115b of the positive polarity in synchronism with the rise and the fall of the above described output S114b of the exclusive OR circuit 114b. Since the output terminals Q of the D-flip-flops 111a and 111b are respectively in a low level and a high level as described above, the NAND circuit 120 provides the output pulses S115b of the above described pulse generators 115b in the form unchanged. The output terminal Q of the D-flip-flop 118 changes in synchronism with the rise or fall of the first head selecting signal HSW (in FIG. 11b) after the issue of the detecting instruction So, namely at the time of $t=t_1$ in FIG. 11, from a low level to a high level and subsequently becomes the low level and the high level repeatedly with a cycle of two fields. The triangular wave generator 119 provides a signal S119 having potential increased from Va by a fixed increase rate $(Vb-Va)/t_f$ in synchronism with the rise of the output of the terminal Q of the D-flip-flop 118 and decreased from Vb to Va in synchronism with the fall of the output of the above described terminal Q, as shown in FIG. 11p. The sample-and-hold circuit 122 samples and holds the output of the triangular wave generator 119 using as sampling pulses, the output S121 of the AND circuit 121 which is a logical product of the output of the NAND circuit 121 and the output of the terminal Q of the D-flip-flop 118, so that potential V is provided, as shown in FIGS. 11n to 11r. The potential V is V=(Va +Vb)/2 in case of x=2.5P, as is clearly understood from the comparison with FIG. 9. Since the control terminal C of the switching circuit 124 is in a high level, the output S122 of the above described sample-and-hold circuit 122 connected to the input terminal Ib of a switching circuit 124, namely, potential V is provided in the third output terminal 135. The above description was made of the operation in the case of x=2.5P. If the position is in the region $X_3$, the same operation is made in the embodiment shown in FIG. 10. More specifically, the output signal O1 becomes a high level and the output signal O2 becomes also a high level, while the potential of the output O3 becomes Va+(x−2P)·(Vb−Va)/P. As is clear from FIGS. 10 and 11, the above described stop position data is provided by the lapse of one-field time as for the output signals O1 and O2 and by the lapse of two-field time as for the output signal O3 after the stop position detecting instruction So is provided, irrespective of the timing for providing the instruction So.

In case where the stop position x is in the region $X_1$, or in the region $X_2$ excluding the points of x=P, 2P, or in the region $X_4$ excluding the points of x=3P, 4P, a quantitative relation becomes reversed at a certain moment in the comparison of either the outputs of the detectors 108a and 108b or the outputs of the detectors 108c and 108d and in the combination of either the outputs of the detectors 108a and 108b or the outputs of the detectors 108c and 108d and signals shown in Table 3 are obtained as the output signals O1, O2 and O3.

Now, description will be made of the output signal O3 in the cases of x=P, 2P, 3P and 4P excluded in the foregoing description. The outputs of the comparators 109a and 109b are both fixed in a high level or a low level and are not changed. Accordingly, the outputs of the terminals Q of the D-flip-flop 111a and 111b are both maintained in a low level. At this time, the control terminal C of the switching circuit 124 is in a low level and an input terminal Ia is connected to the third output terminal 135. On the other hand, the above described input terminal Ia is connected to the output terminal of the second switching circuit 127. The second switching circuit 127 has a control terminal C', to which the output of the exclusive OR gate 126 controlled by the outputs of the comparators 109a and 109b is supplied. The control terminal C' is set to the lower side if the output supplied thereto is of a high level and set to the upper side if the output supplied thereto is of a low level and the comparators 109a and 109b provide high level or low level signals in the relation as described in Table 2 and as a result, Va is provided as the output O3 of the third output terminal 135 in case of x=P, 3P and Vb is provided in case of x=2P or 4P. The fixed Va and Vb in such cases are generated by connection of the resistors R1, R2 and R3. As described above, the output signal O3 shown in Table 3 is obtained also at the points of x=P, 2P, 3P and 4P.

To sum up, according to the second embodiment shown in FIG. 10, it can be determined by the output signals O1 and O2 in a high level and a low level in what region out of the regions $X_1$, $X_2$, $X_3$ and $X_4$ the stop position x of the magnetic tape 1 is located and furthermore, the value of x can be detected from the potential of the output signal O3. Although in the FIG. 10 embodiment, the pilot signals $f_1$ and $f_2$ were used as signals for beating with the reproduced signal, the same detection operation can be made by using other combination, for example, $f_1$ and $f_4$; $f_3$ and $f_2$; or $f_3$ and $f_4$.

TABLE 3

| stop position of the magnetic tape | O1 | O2 | O3 |
|---|---|---|---|
| $X_1$ $0 < x < x < P$ | H | L | Va + (Vb − Va) · x/P |
| $X_2$ $P \leq x \leq 2P$ | L | H | Va + (Vb − Va) · (x − P)/P |
| $X_3$ $2P < x < 3P$ | H | H | Va + (Vb − Va) · (x − 2P)/P |
| $X_4$ $3P \leq x \leq 4P$ | L | L | Va + (Vb − Va) · (x − 3P)/P |

By beating using signals formed separately from the reproduced signal, advantages are brought about in that the frequency of a comparison signal can be lowered and that the same frequency can be applied for the bandpass filters 107a and 107c or 107b and 107d. There is also an advantage that a special oscillating circuit needs not be provided besides the pilot signal oscillating circuit since the pilot signals utilized as the above described signals for beating are provided in a VTR as signals to be recorded in a manner superimposed on a video signal.

In addition, although in the embodiment shown in FIG. 10, comparison of the pilot signals $f_1$ and $f_3$ contained in the reproduced signal and comparison of the pilot signals $f_2$ and $f_4$ were made simultaneously, the same result of detection can be obtained if the above described two comparison operations are made successively. In such a case of successive comparison, only one comparator is needed.

As described above, according to the second embodiment, among four pilot signals $f_1$ to $f_4$ of different frequencies successively recorded in advance in a manner superimposed on a video signal, an output representing the result of comparison of the pilot signals $f_1$ and $f_3$ and an output representing the result of comparison of the pilot signals $f_2$ and $f_4$ from the reproduced signal are applied, at the time of reproduction and stop of a magnetic tape, to generate a signal for specifying the region where the magnetic head is located among a plurality of regions defined in the longitudinal direction of the magnetic tape and as a result, the stop position of the magnetic tape can be detected based on the above described signal for specifying the region. Accordingly, this embodiment can be effectively applied for many purposes, e.g. for shortening the pull-in time in a servo system for control of the travelling of a magnetic tape, for maintainig the continuity of the pilot signals in successive recording, for controlling the travelling of a magnetic tape to obtain a noiseless still picture.

Next, description will be made of a magnetic video tape reproducing apparatus or a magnetic video tape recording and reproducing apparatus (VTR) in which a tape stop position detecting apparatus as described above is utilized to intermittently drive a magnetic tape at the time of slow reproduction or still reproduction.

A VTR in which a control track is provided on a magnetic tape to record and reproduce a control signal therein and travelling of the magnetic tape is controlled by the above stated control signal is conventionally utilized. In such a VTR, as a method for making noiseless slow reproduction and still reproduction, a method is adopted in which at the time of slow reproduction, the tape is driven intermittently, in other words, travelling and stop of the tape are repeated and at the time of still reproduction, the tape is made to stop after the above stated intermittent driving operation is made several times. In order to obtain a noiseless reproduced picture by such a method, it is needed that a positional relation between a recording track and a rotational head should be always in a range causing no noise in the reproduced picture in the state where the tape is stopped. For the purpose of obtaining such a positional relation, a control signal reproduced in the state where the tape travels is used as position data of the track and travelling amount of the tape after the detection of this control signal is controlled so that the tape may be stopped in a position causing no noise in the picture.

Figure 12:
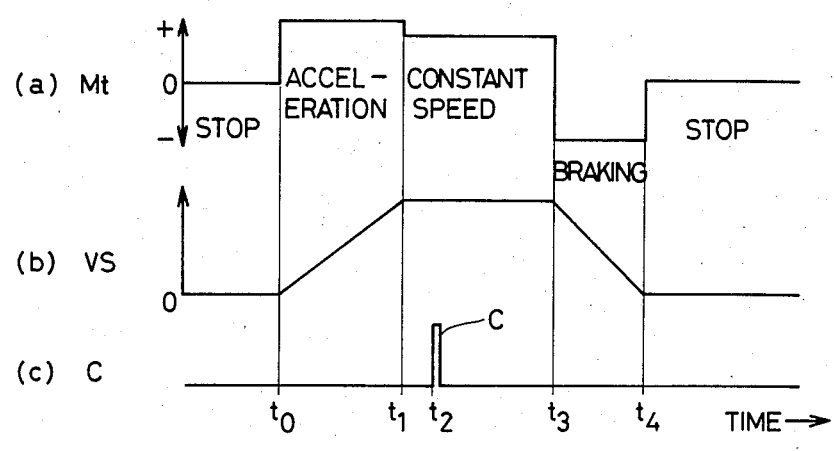
FIGS. 12(a) thru 12(c) show graphs for explaining a conventional method of tape travelling control.

FIG. 12 shows a control method in such a conventional apparatus, in which (a) indicates torque Mt applied to a capstan motor; (b) indicates tape speed VS; and (c) indicates a control signal C. As can be seen from FIG. 12, according to this control method, the tape speed is accelerated from the time $t_0$ till the time $t_1$ and then the tape is made to travel at a constant speed and when a control signal C is detected at the time $t_2$, braking is started after the lapse of delay time $(t_3-t_2)$ and braking is brought to an end at the time $t_4$ when the tape speed VS is nearly zero, so that the tape is made to stop. The above described delay time $(t_3-t_2)$ is called tracking delay time and by increasing or decreasing this time, the tape travelling amount after the detection of the control signal C is increased or decreased. Generally, this time can be adjusted by a variable resistor, whereby the tape can be stopped in a position where the reproduced picture appears in the best condition, that is, in the optimum tape stop position.

However, in such a conventional apparatus as described above, it is necessary for an operator to adjust the above described tracking delay time and the adjustment operation is troublesome. On the other hand, if a tape stop position detecting apparatus as described previously is used for control of the travelling of a magnetic tape, noiseless slow reproduction and still reproduction can be realized, without any adjustment operation by an operator.

Figure 13A:
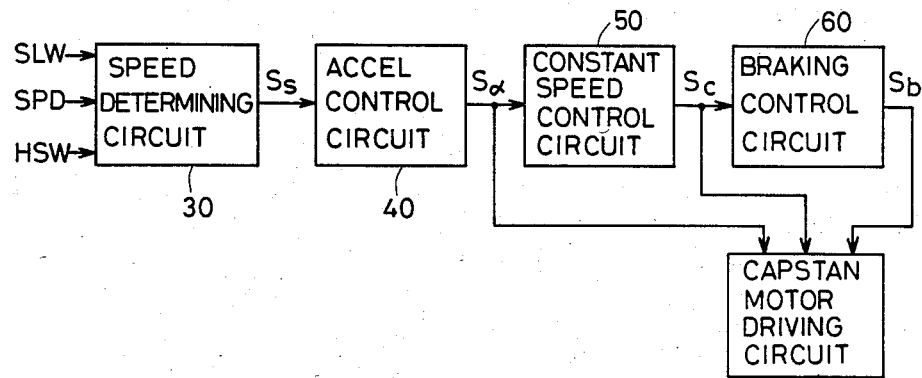
FIG. 13A is a block diagram showing a control system of a VTR for intermittently driving a magnetic tape and FIG. 13B is a graph showing waveforms of the signals in the apparatus shown in FIG. 13A.
Figure 13B:
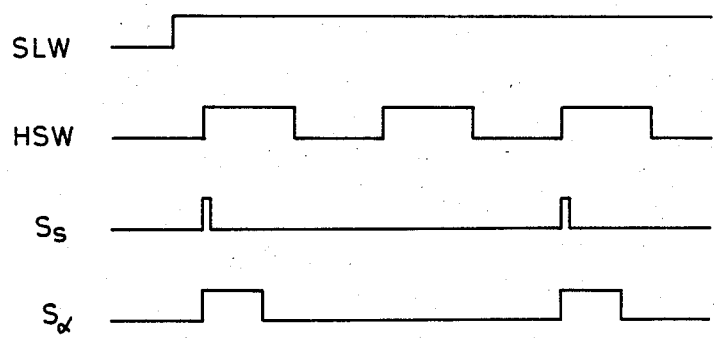

FIG. 13A is a block diagram showing a control system of a VTR for intermittently driving a magnetic tape and FIG. 13B shows waveforms of the respective signals in FIG. 13A. To a speed determining circuit 30, a signal SLW instructing slow reproduction, a signal SPD instructing slow speed and a head selecting signal HSW are supplied. The signals SLW and SPD are provided by a user by means of a manual setter. The speed determining circuit 30 provides a signal $S_s$ of a frequency changing in accordance with the signal SPD. An acceleration control circuit 40 operates in response to the signal $S_s$ to generate intermittently, by a predetermined period of time, an acceleration signal $S_\alpha$ for controlling the acceleration of the magnetic tape. A constant speed control circuit 50, which will be described in detail afterwards, operates in response to the acceleration signal $S_\alpha$ to generate a constant speed signal $S_c$ for controlling the constant speed travelling of the magnetic tape. A braking control circuit 60 operates in response to the constant speed signal $S_c$ to generate a braking signal $S_b$ for applying braking to the travelling of the magnetic tape. A capstan motor driving circuit 70 operates in response to the above described signals $S_a$, $S_c$ and $S_b$ to drive a capstan motor (not shown).

Figure 14:
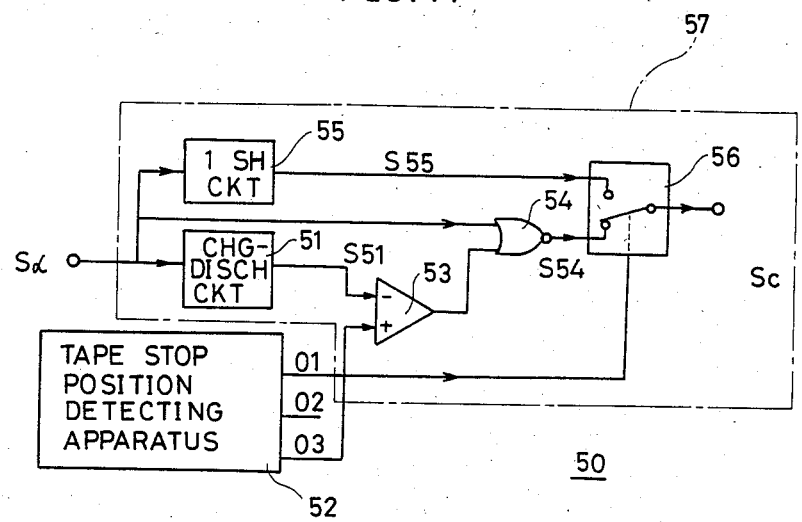
FIG. 14 is a block diagram showing a constant speed control circuit using a tape stop position detecting apparatus shown in FIG. 6.

First, description will be made of a constant speed control circuit using a tape stop position detecting apparatus shown in FIG. 6. FIG. 14 is a block diagram showing such a constant speed control circuit 50. In FIG. 14, the reference character 52 denotes a tape stop position detecting apparatus shown in FIG. 6 and the reference character 57 denotes a constant speed signal generating circuit for determining the constant speed travelling time of a magnetic tape according to the output of the tape stop position detecting apparatus 52. The constant speed signal generating circuit 57 comprises: a charging and discharging circuit 51 and a one-shot circuit 55 for inputting an acceleration signal $S_\alpha$ controlling the acceleration time of a capstan motor; a comparator 53 for inputting an output of the charging and discharging circuit 51 and an output signal O3 of the tape stop position detecting apparatus 52; a NOR circuit 54 for inputting the above stated acceleration signal $S_\alpha$ and an output of the comparator 53; and switching circuit 56 for providing and output of the NOR circuit 54 when an output signal O1 of the tape stop position detecting apparatus 52 is "H" and for providing an output of the one-shot circuit 55 when the above stated output O1 is "L". An output of the switching circuit 56 becomes a constant speed signal $S_c$ for controlling the constant speed travelling time of a capstan motor. A capstan motor driving circuit to which the constant speed signal $S_c$ is inputted is shown in FIG. 13A. Since the stop position detecting apparatus 52 were already described in detail, description thereof is omitted hereinafter.

Now, description will be made of the operation for realizing noiseless slow reproduction and still reproduction using output signals of the above described tape stop position detecting apparatus 52.

Figure 16:
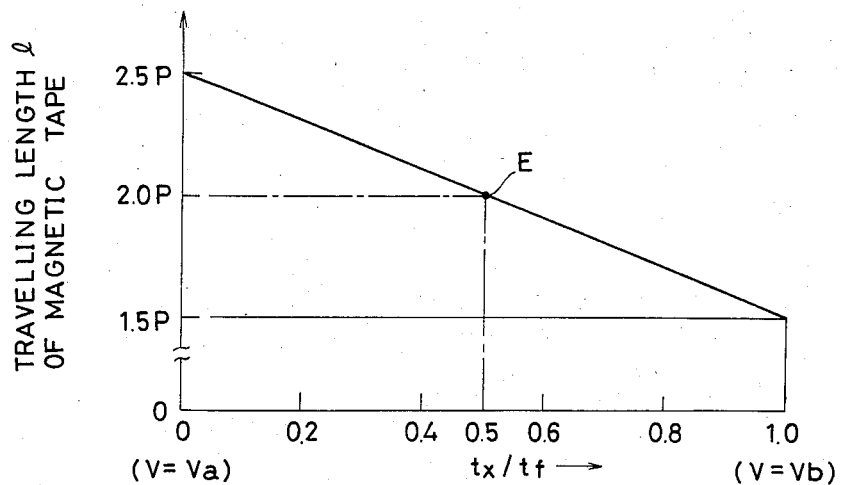
FIG. 16 is a graph showing a relation between a stop position of a magnetic tape and a travelling length thereof.

It is assumed that slow reproduction and still reproduction are made using two heads having the same azimuth as in the heads for recording the tracks 2b and 2d shown in FIGS. 1 and 5. As is clear from these figures, the optimum stop positions x for the tape in which a video signal can be reproduced stably are x=0.5P and 2.5P. Accordingly, if travelling of the tape is controlled according to a relation between a travelling length l of the magnetic tape 1 and a value of $t_x/t_f$, as shown in FIG. 16 for example, after the detection of the tape stop position x by the above described tape stop position detecting apparatus 52, noiseless slow reproduction and still reproduction can be realized. FIG. 16, the point E represents a case of x=2.5P and $t_x/t_f=0.5$ as shown in FIG. 5 and since the present stop position of the tape in this case is an optimum position, the subsequent travelling of the tape needs be made only by a length 2.0P corresponding to one frame.

Figure 15:
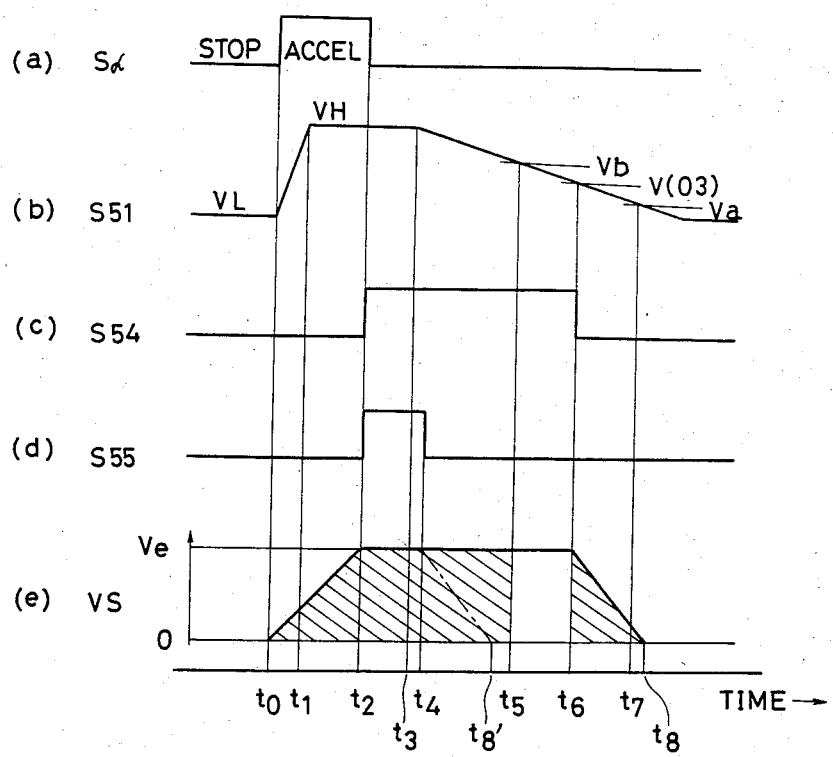
FIGS. 15(a) thru (e) show timing charts for explaining the operation of the apparatus shown in FIG. 4.

Control of the travelling of the tape, that is, control of the constant speed travelling time of the capstan motor will be described using the timingchart in FIG. 15. FIG. 15 shows a case where the stop position x of the tape is in the region $X_1$ or $X_3$.

As shown in (a) and (b) of FIG. 15, the magnetic tape 1 is in a stop state at the time $t_0$ and acceleration is made from this state for a period of $(t_2-t_0)$ $S_\alpha$ is the above described acceleration signal. At this time, the output S51 of the charging and discharging circuit 51 changes from the low potential VL before the time $t_0$ to the high potential VH for a period of $(t_1-t_0)$ as shown in (b) of FIG. 15. In this case, the potentials VL and VH and a changing range of Va and Vb of the output signal O3 of the tape stop position detecting apparatus 52 are in a relation of $VL<Va<Vb<VH$ and the time is in a relation of $t_1<t_2$. The charging and discharging circuit 51 starts discharging by the lapse of a period of $(t_3-t_2)$ after the acceleration ending time $t_2$. At the time of discharging, assuming that the output S51 of the charging and discharging circuit 51 become equal to the potential Vb or Va of the triangular wave generator 23 of the tape stop position detecting apparatus 52 at the time $t_5$ or $t_7$ and that the output S51 becomes equal to the potential V of the output signal O3 at the time $t_6$, an output S54 as shown in (c) of FIG. 15 is obtained from the NOR circuit 54 and this output S54 is provided as a constant speed signal $S_c$ through the switching circuit 56. In this case, as shown in (e) of FIG. 15, the speed VS of the tape 1 is maintained to a constant speed Ve from the time $t_2$ till the time $t_6$ and after that, from the time t till the time $t_8$, braking is applied to the tape 1 to bring the tape 1 in a stop state. The charging and discharging circuit 51 is set to satisfy the condition of $(t_7-t_5)\cdot Ve=P$ and accordingly, a period of $(t_6-t_5)$ changes in a range of 0 to $(t_7-t_5)$ according to the change of the potential V of the output signal O3 in a range of Vb to Va. In other words, the length of the tape to be sent in a period from the time $t_5$ to the time $t_6$ changes in a range of 0 to P.

In addition, in this case, the length of the tape (shown by a shaded portion) sent by the acceleration from $t_0$ to $t_2$, the constant speed travelling from $t_2$ to $t_5$ and the braking from $t_6$ to $t_8$ is set to be 1.5P and accordingly by this length and the above described tape length 0 to P to be controlled, the magnetic tape 1 can be sent to the optimum stop position according to the relation between the stop position and the tape travelling length as shown in FIG. 16 if the stop position x is in the region $X_1$ or $X_3$. The tape travelling length mentioned above is a value obtained by integrating by time, the tape speed VS shown in (e) of FIG. 15.

The above described operation was made in the case where the stop position x is in the region $X_1$ or $X_3$. In the following, operation in case where the stop position x is in the region $X_2$ or $X_4$ will be described. In this case, the output signal O1 of the tape stop position detecting apparatus 52 is "L" and through the switching circuit 56 receiving this output signal O1, an output S55 of the one-shot circuit 55 is provided as a constant signal $S_c$. The one-shot circuit 55 provides a signal S55 which becomes "H" only in a period of $(t_4-t_2)$ in synchronism with the rise of the acceleration signal $S_\alpha$, as shown in (a) and (d) of FIG. 15. Accordingly, the magnetic tape 1 in this case is controlled so that acceleration is made for a period of $(t_2-t_0)$, travelling is made at a constant speed for a period of $(t_4-t_2)$ and braking is applied (as shown by a chain line in (e) of FIG. 15 for a period of $(t_8-t_6)$(from the time $t_4$ till the time $t'_8$). The fall point $t_4$ of the one-shot circuit 55 is set to satisfy the condition of $(t_5-t_4)\cdot Ve=0.5P$ and accordingly, the tape travelling length in this case can be made to be 1P since the shaded portion in (e) of FIG. 15 is set to 1.5P as described above. Thus, at the time of starting slow reproduction or still reproduction etc., if the tape stop position x is in the region $X_2$ or $X_4$, the tape 1 is first sent by 1P to be located in the region $X_1$ or $X_3$ and by the subsequent travelling of the tape, the tape 1 can be sent to the optimum stop position as described above.

In a VTR using a constant speed signal generating circuit 50 as described above, the stop position of the tape is detected by the tape stop position detecting apparatus 52 and the constant speed travelling time of the tape is controlled based on the detected data whereby the tape is sent to a stop position optimum for slow reproduction and still reproduction. Accordingly, without any adjustment operation by an operator, a noiseless slow reproduced picture or still reproduced picture can be extremely easily obtained.

In the above described embodiment, analog signal processing was adopted in the triangular wave generator 23 and sample-and-hold circuit 24 in the tape stop position detecting apparatus 52 or in the charging and discharging circuit 51 etc. However, it goes without saying that the same function can be also performed by digital signal processing using clock signals and counters etc. In addition, the tape travelling direction described above may be either the regular direction or the reverse direction and accordingly, not only in the normal slow reproduction but also in reversed slow reproduction, the same effect as described above can be obtained.

Figure 17:
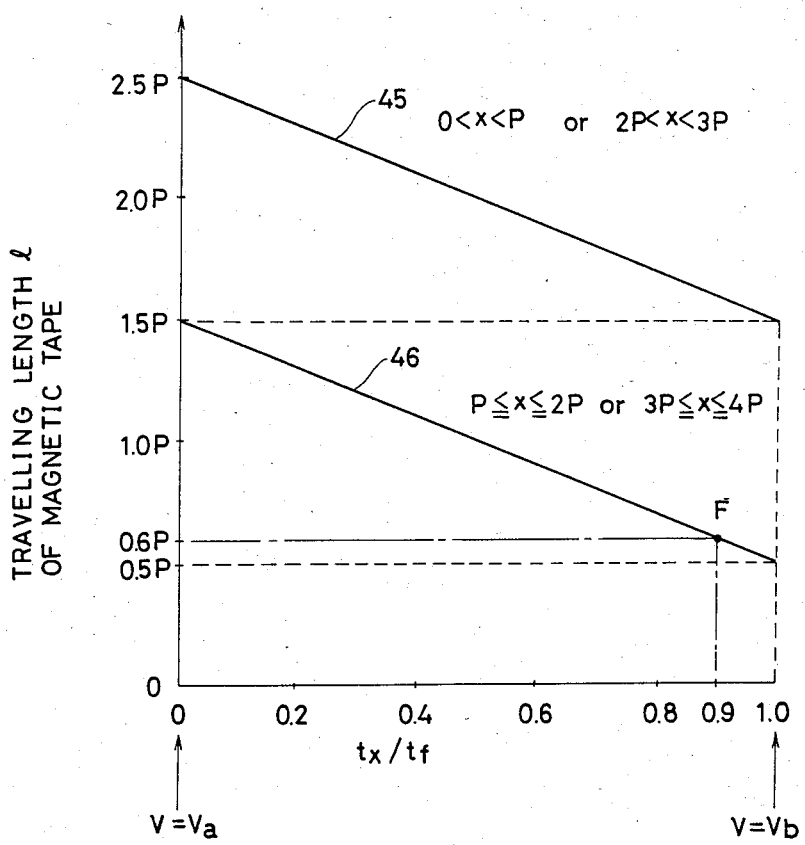
FIG. 17 is a graph for explaining a relation between a stop position of a magnetic tape and a travelling length thereof.

Finally, description will be made of a constant speed control circuit using a tape stop position detecting apparatus shown in FIG. 10. Also in this case, as in the above described case, it is assumed that slow reproduction and still reproduction are made by using two heads having the same azimuth as in the heads for recording the tracks 2b and 2d shown in FIG. 1. As is clear from FIG. 1, the optimum stop position of the tape for reproducing a video signal stably is x=0.5P or 2.5P. Accordingly, if the magnetic tape is sent according to the relation between a travelling length of the magnetic tape and a value of $t_x/t_f$ as shown in FIG. 17, after the detection of the magnetic tape stop position x by the tape stop position detecting apparatus, noiseless slow reproduction and still reproduction can be realized. In FIG. 17, the line 45 represents a case where x is in the region $X_1$ or $X_3$ while the line 46 represents a case where x is in the region $X_2$ or $X_4$, and the point F indicates that the length of the tape to be sent is 0.6P in the conditions of the magnetic tape stop position x=1.9P and the value $t_x/t_f=0.9$ shown in FIG. 1.

Figure 18:
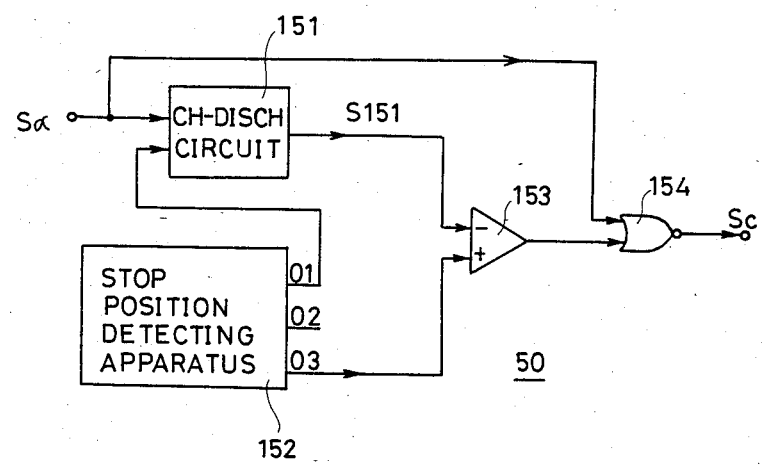
FIG. 18 is a block diagram showing a constant speed control circuit using a tape stop position detecting apparatus in FIG. 10.

FIG. 18 is a block diagram showing a constant speed control circuit 50 using a tape stop position detecting apparatus in FIG. 10. Referring to FIG. 18, this circuit 50 comprises: a tape stop position detecting apparatus 152 shown in FIG. 10; a charging and discharging circuit 151 to which an acceleration signal $S_\alpha$ for controlling the acceleration time of a capstan motor and an output signal O1 of the tape stop position detecting apparatus 152 are applied as input signals; a comparator 153 to which an output S151 of the charging and discharging circuit 151 and an output signal O3 of the tape stop position detecting apparatus 152 are applied as input signal; and a NOR circuit 154 to which the above described acceleration signal $S_\alpha$ and an output of the comparator 153 are applied as input signal. The detecting instruction provided to the tape stop position detecting apparatus 152 is a signal which becomes of a high level in the state where the magnetic tape is stopped and becomes of a low level in the state where the magnetic tape travels. The output of the NOR circuit 154 is supplied to the capstan motor driving circuit 70 shown in FIG. 13A etc. as a constant speed signal $S_c$ for controlling the constant speed travelling time of the capstan motor. FIG. 18 shows only a structure of a constant speed control circuit out of the whole structure of a VTR. The structure of the other portions is nearly the same as in a conventional video tape recorder and therefore description thereof is omitted.

Figure 19:
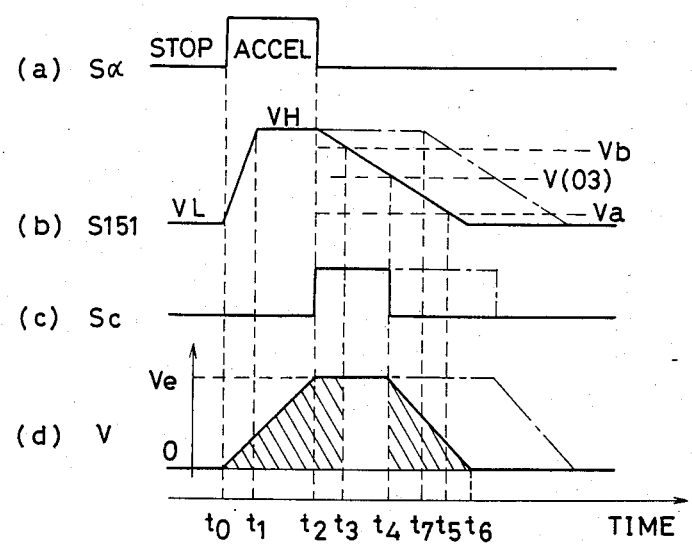
FIGS. 19(a) thru (d) show timing charts for explaining the operation of the apparatus shown in FIG. 18.

FIG. 19 is a time chart for explaining the operation in the embodiment in FIG. 18. The operation in the embodiment shown in FIG. 18 will be described with reference to FIG. 19. In the following description, it is assumed that the stop position x of the magnetic tape is in the region $X_2$ or $X_4$ (see FIG. 8).

As shown in (a) and (d) of FIG. 19, travelling of the magnetic tape 1 is accelerated from the stop state at the time $t_0$, for a period of $(t_2-t_0)$ At this time, the output S151 of the charging and discharging circuit 151 changes from the low potential VL before the time t to the high potential VH for a period of $(t_1-t_0)$. In this case, the potentials VL and VH and a changing range of Va and Vb of the output signal O3 are in a relation of $VL<Va<Vb<VH$ and the times are in a relation of $t_1<t_2$. Now, if x is in the region $X_2$ or $X_4$, the output signal O1 of the tape stop position detecting apparatus 152 is of a low level and at this time, the charging and discharging circuit 151 starts discharging from the time $t_2$ when the acceleration is ended, as shown by the solid line in (b) of FIG. 19. In discharging, the output S151 of the charging and discharging circuit 151 becomes equal to Vb or Va at the time $t_3$ and $t_5$ and becomes equal to the potential V of the output signal O3 at the time $t_4$. As shown in (c) and (d) of FIG. 19, the speed VS of the magnetic tape is maintained to a constant speed Ve from the time $t_2$ till the time $t_4$ and after that, till the time $t_6$ braking is applied so that the magnetic tape is in a stop state. Now, it is assumed that $t_2$, $t_3$ and Ve are set so that the length of the magnetic tape to be sent by the operation corresponding to the shaded portions in (d) of FIG. 19, namely, by the acceleration for a period of $(t_2-t_1)$, the constant speed travelling for a period of $(t_3-t_2)$ and the braking for a period of $(t_6-t_4)$ becomes 0.5P. The charging and discharging circuit 151 is set to satisfy the condition of $(t_5-t_3)\cdot Ve=P$. Accordingly, in case where x is in the region $X_2$ or $X_4$, the time $t_4$ for starting the braking changes in accordance with the potential V of the output signal O3 and the length of the magnetic tape to be sent for a period from the time $t_3$ to the time $t_4$ changes in a range of 0.5P to 1.5P so that the magnetic tape is sent to the optimum stop position.

In case where the magnetic tape stop position x is in the region $X_1$ or $X_3$, the tape is sent by a length larger by P than in the case of the region $X_2$ or $X_4$ so that the tape is sent to the optimum stop position as seen in FIG. 17. At this time, the charging and discharging circuit 151 detects the output signal O1 in a high level and starts discharging, as shown by a chain line in (b) of FIG. 19, from the time $t_7$ with the same inclination as that of the solid line. In this case, $t_7$ is set to satisfy the condition of $(t_7-t_2)\cdot Ve=P$.

In the above described embodiment also, analog signal processing was adopted in the triangular wave generator 119 and the sample-and-hold circuit 122 in the tape stop position detecting apparatus 152 or the charging and discharging circuit 151 etc. However, needless to say, the same function can be performed also by digital signal processing using clock signals and counters etc.

In addition, in the foregoing embodiment, the case for realizing so-called field slow or field still reproduction by using heads of the same azimuth was described. However, also for realizing frame slow or frame still reproduction using heads of the different azimuthes, the constant speed travelling time of a magnetic tape can be controlled in the same manner based on the output of the stop position detecting apparatus. The travelling direction of a magnetic tape may be either the regular direction or the reverse direction. Accordingly, the embodiment can be applied not only for the normal slow reproduction but also for reversed slow reproduction.

As described above, also in a VTR using a constant speed signal generating circuit 50 as shown in FIG. 18, the stop position of the tape is detected based on the pilot signals contained in the reproduced signal and according to the result of detection, the constant speed travelling time of the tape is determined, and accordingly, slow reproduction and still reproduction of high quality can be realized without any adjustment operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tape stop position detecting apparatus for a magnetic video reproducing apparatus in which first to fourth pilot signals of different frequencies recorded in first to fourth video tracks, respectively, in a magnetic tape cyclically together with a video signal are reproduced from said magnetic tape, comprising:
   a plurality of rotational magnetic heads for reproducing said signals from said magnetic tape to provide a reproduced signal,
   comparing means connected to said rotational magnetic heads for comparing the amounts of predetermined two pilot signals out of said first to fourth pilot signals contained in said reproduced signal to provide a comparison output,
   head selecting signal generating means for generating a head selecting signal for selection of said rotational magnetic heads,
   region signal generating means connected to said comparing means for generating, in response to said comparison output, a region signal indicating in which region among the first to fourth regions associated with said first to fourth video tracks the stop position of said magnetic tape is located, said stop position of said magnetic tape being the reproducing position on said magnetic tape when said magnetic tape is at a stop, and
   position signal generating means connected to said comparing means and said head selecting signal generating means for generating position signal indicating the stop position of said magnetic tape in response to said comparison output and said head selecting signal in case where the stop position of said magnetic tape is located in predetermined two regions out of said first to fourth regions.

2. A tape stop position detecting apparatus in accordance with claim 1 wherein the frequencies of said first to fourth pilot signals satisfy the following conditions, assuming that said frequencies are $f_1$ to $f_4$, respectively:

$$|f_1-f_2| \div |f_3-f_4| = f_a;$$

$$|f_1-f_4| \div |f_2-f_3| = f_b;$$

$$f_a \neq f_b$$

3. A tape stop position detecting apparatus in accordance with claim 2, wherein
said predetermined two pilot signals out of said first to fourth pilot signals are the first and the third pilot signals, and
said predetermined two regions out of said first to fourth regions are the first and the third regions.

4. A tape stop position detecting apparatus in accordance with claim 2, wherein
said predetermined two pilot signals out of said first to fourth signals are the second and the fourth signals, and
said predetermined two regions out of said first to fourth regions are the second and the fourth regions.

5. A tape stop position detecting apparatus in accordance with claim 1, wherein said comparing means comprises:
a pilot signal generating circuit for generating a fifth pilot signal having a frequency different from the frequencies of the two pilot signals to be compared,
a balanced modulator connected to said magnetic heads and said pilot signal generating circuit for generating a first and a second beat signals in response to predetermined two pilot signals out of said first to fourth pilot signals and to said fifth pilot signal, and
a comparing circuit connected to said balanced modulator for comparing the amounts of said first beat signal and said second beat signal to provide said comparison output.

6. A tape stop position detecting apparatus in accordance with claim 1, wherein
said region signal comprises a first and second region signals each having a first and second states,
said region signals generating means comprises
a first regin signal generating circuit connected to said comparing means for generating said first region signal in response to said comparison output and
a second region signal generating circuit connected to said comparing means for generating said second region signal in response to said comparison output, and
by combination of the states of said first and second region signals, it can be determined in which region among said first to fourth regions the stop position of said magnetic tape is located.

7. A tape stop postion detecting apparatus in accordance with claim 1, wherein
said position signal generating means comprises
a triangular wave signal generator connected to said head selecting signal generating means for generating a triangular wave signal in response to said head selecting signal and
a sample-and-hold circuit connected to said comparing means and said triangular signal generator for sampling and holding said triangular wave signal in response to said comparison output so as to provide said position signal, and
according to the amount of said position signal, the stop position of said magnetic tape is indicated.

8. A tape stop position detecting apparatus for a magnetic video reproducing apparatus in which first to fourth pilot signals of different frequencies recorded respectively in first to fourth video tracks in a magnetic tape cyclically together with a video signal are reproduced from said magnetic tape, comprising:
a plurality of rotational magnetic heads for reproducing said signals from said magnetic tape to provide reproduced signal,
first comparing means connected to said rotational magnetic heads for comparing the amounts of said first and third pilot signals contained in said reproduced signal to provide a first comparison output,
second comparing means connected to said rotational magnetic heads for comparing the amounts of said second and fourth pilot signals contained in said reproduced signal to provide a second comparison output,
head selecting signal generating means for generating a head selecting signal for selection of said rotational magnetic heads,
region signal generating means connected to said first and second comparing means for generating, in response to said first and second comparison outputs, a region signal indicating in which region among said first to fourth regions associated with said first to fourth video tracks the stop position of said magnetic tape is located, said stop position of said magnetic tape being the reproducing position on said magnetic tape when said magnetic tape is at a stop, and
position signal generating means connected to said first and second comparing means and said head selecting signal generating means for generating a postion signal indicating the stop postion of said magnetic tape in response to said first and second comparison outputs and said head selecting signal.

9. A tape stop position detecting apparatus in accordance with claim 8, wherein the frequencies of said first to fourth pilot signals satisfy the following conditions, assuming that said frequencies are $f_1$ to $f_4$, respectively:

$$|f_1-f_2| \div |f_3-f_4|=f_a;$$

$$|f_1-f_4| \div |f_2-f_3|=f_b;\ f_a \neq f_b$$

10. A tape stop position detecting apparatus in accordance with claim 8, wherein
said first comparing means comprises
a first pilot signal generating circuit for generating a fifth pilot signal having a frequency different from the frequencies of said first and third pilot signals,
a first balanced modulator connected to said rotational magnetic heads and said first pilot signal generating circuit for providing a first and second beat signals in response to said first and third pilot signals and to said fifth pilot signal and
a first comparing circuit connected to said first balanced modulator for comparing the amounts of said first beat signal and said second beat signal to provide said first comparison output, and
said second comparing means comprises
a second pilot signal generating circuit for generating a sixth pilot signal having a frequency different from the frequencies of said first and fourth pilot signals,
a second balanced modulator connected to said rotational magnetic heads and said second pilot signal generating circuit for providing a third and fourth beat signals in response to said second and fourth pilot signals and to said sixth pilot signal, and
a second comparing circuit connected to said second balanced modulator for comparing the amounts of said third beat signal and said fourth beat signal to provide said second comparison output.

11. A tape stop position detecting apparatus in accordance with claim 8, wherein
said region signal comprises a first and second region signals each having a first and second states,
said region signal generating means comprises
a first region signal generating circuit connected to said first and second comparing means for generating said first region signal in response to said first and second comparison outputs and
a second region signal generating circuit connected to said first and second comparing means for generating said second region signal in response to said first and second comparison outputs, and
by combination of the states of said first and second region signals, it can be determined in which region among said first to fourth regions the stop position of said magnetic tape is located.

12. A tape stop position detecting apparatus in accordance with claim 8, wherein
said position signal generating means comprises
a triangular wave signal generator connected to said head selecting signal generating means for generating a triangular wave signal in response to said head selecting signal, and
a sample-and-hold circuit connected to said first and second comparing means and said triangular wave signal generator for sampling and holding said triangular wave signal in response to said first and second comparison outputs so as to provide said position signal, and
according to the amount of said position signal, the stop position of said magnetic tape is indicated.

13. A magnetic video reproducing apparatus for making intermittently travel a magnetic tape where first to fourth pilot signals are respectively recorded in first to fourth video tracks cyclically together with a video signal, so that said signals are reproduced from said magnetic tape, comprising:
tape stop position detecting means for detecting predetermined two pilot signals out of said first to fourth pilot signals to generate a region signal indicating in which region among said first to fourth regions associated with said first to fourth video tracks the stop position of said magnetic tape is located and to generate a position signal indicating the stop position of said magnetic tape in case where the stop position of said magnetic tape is located in predetermined two regions out of said first to fourth regions, said stop position of said magnetic tape being the reproducing position on said magnetic tape when said magnetic tape is at a stop,
acceleration signal generating means for generating intermittently by a predetermined period, an acceleration signal for control of the acceleration time of said magnetic tape, and
constant speed signal generating means connected to said tape stop position detecting means and said acceleration signal generating means for generating a constant speed signal for control of the constant speed travelling time of said magnetic tape, the range of time of said constant speed signal being changed according to said acceleration signal, said region signal and said position signal.

14. A magnetic video reproducing apparatus in accordance with claim 13, wherein said constant speed signal generating means comprises:
first control signal generating means connected to said tape stop position detecting means and said acceleration signal generating means for providing a first control signal in response to the stop of said acceleration signal and for stopping the application of said first control signal in response to said position signal whereby said magnetic tape is made to travel to a position most suitable for stably reproducing said video signal in the state where said magnetic tape is stopped,
second control signal generating means connected to said acceleration signal generating means for providing a second control signal for a predetermined period of time in response to the stop of said acceleration signal whereby said magnetic tape is made to travel for one pitch of said video track, and
switching means connected to said first and second control signal generating means and said tape stop position detecting means for providing either said first control signal or said second control signal by switching in response to said region signal.

15. A magnetic video reproducing apparatus in accordance with claim 14, wherein said tape stop position detecting means comprises:
a plurality of rotational magnetic heads for reproducing a signal from said magnetic tape to provide a reproduced signal,
comparing means connected to said rotational magnetic heads for comparing the amounts of predetermined two pilot signals out of said first to fourth pilot signals contained in said reproduced signal to provide a comparison output,
head selecting signal generating means for generating a head selecting signal for selection of said rotational magnetic heads,
region signal generating means connected to said comparing means for generating said region signal in response to said comparison output, and
position signal generating means connected to said comparing means and said head selecting signal generating means for generating said position signal in response to said comparison output and said head selecting signal in case where the stop position of said magnetic tape is located in predetermined two regions out of said first to fourth regions.

16. A magnetic video reproducing apparatus in accordance with claim 15, wherein
said position signal generating means comprises means for generating said position signal the amount of which changes according to the stop position of said magnetic tape, and
said first control signal generating means comprises:
charging and discharging circuit connected to said acceleration signal generating means for providing output voltage having a predetermined pattern in response to said acceleration signal,
a comparator connected to said charging and discharging circuit and said position signal generating means for comparing the amounts of said output voltage and said position signal, and
a NOR circuit connected to said acceleration signal generating means and said comparator for providing said first control signal.

17. A magnetic video reproducing apparatus in accordance with claim 14, wherein said second control signal generating means comprises a one-shot circuit for providing said second control signal.

18. A magnetic video reproducing apparatus for making intermittently travel a magnetic tape where first to fourth pilot signals are recorded in first to fourth video tracks, respectively, cyclically with a video signal, so that said signals are reproduced from said magnetic tape, comprising:
   tape stop position detecting means for detecting said first to fourth pilot signals to generate a region signal indicating in which region among said first to fourth regions associated with said first to fourth video tracks the stop position of said magnetic tape is located and to generate a position signal indicating the stop postion of said magnetic tape, said stop position of said magnetic tape being the reproducing position on said magnetic tape when magnetic tape is at a stop,
   acceleration signal generating means for generating intermittently by a predetermined period an acceleration signal for control of the acceleration time of said magnetic tape, and
   constant speed signal generating means connected to said tape stop position detecting means and said acceleration signal generating means for generating a constant speed signal for control of the constant speed travelling time of said magnetic tape, the range of time of said constant speed signal being changed according to said acceleration signal, said region signal and said position signal.

19. A magnetic video reproducing apparatus in accordance with claim 18, wherein said constant speed signal generating means provides said constant speed signal in response to the stop of said acceleration signal and stops the application of said constant speed signal in response to said region signal and said position signal whereby said magnetic tape is made to travel to a position most suitable for stably reproducing said video signal in the state where said magnetic tape is stopped.

20. A magnetic video reproducing apparatus in accordance with claim 19, wherein said tape stop position detecting means comprises:
   a plurality of rotational magnetic heads for reproducing a signal from said magnetic tape to provide a reproduced signal,
   first comparing means connected to said rotational magnetic heads for comparing the amounts of said first and third pilot signals contained in said reproduced signal to provide a first comparison output,
   second comparing means connected to said rotational magnetic heads for comparing the amounts of said second and fourth pilot signals contained in said reproduced signal to provide a second comparison output,
   head selecting signal generating means for generating a head selecting signal for selection of said rotational magnetic heads,
   region signal generating means connected to said first and second comparing means for generating said region signal in response to said first and second comparison outputs, and
   position signal generating means connected to said first and second comparing means and said head selecting signal generating means for generating said position signal in response to said first and second comparison outputs and to said head selecting signal.

21. A magnetic video reproducing apparatus in accordance with claim 20, wherein
   said position signal generating means comprises means for generating said position signal the amount of which changes according to the stop position of said magnetic tape, and
   said constant speed signal generating means comprises:
      a charging and discharging circuit connected to said acceleration signal generating means and said region signal generating means for providing output voltage having a predetermined pattern in response to said acceleration signal and said region signal,
      a comparator connected to said charging and discharging circuit and said position

* * * * *